US010816397B2

(12) United States Patent
Safaee et al.

(10) Patent No.: US 10,816,397 B2
(45) Date of Patent: Oct. 27, 2020

(54) DEVICE AND SYSTEM FOR MEASURING FLICKER

(71) Applicants: Alireza Safaee, Bedford, MA (US); Bernhard Siessegger, Unterschleissheim (DE); Marijan Kostrun, Cowley, MA (US)

(72) Inventors: Alireza Safaee, Bedford, MA (US); Bernhard Siessegger, Unterschleissheim (DE); Marijan Kostrun, Cowley, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 701 days.

(21) Appl. No.: 15/613,311

(22) Filed: Jun. 5, 2017

(65) Prior Publication Data
US 2018/0348051 A1    Dec. 6, 2018

(51) Int. Cl.
*G01J 1/44*    (2006.01)
*H04N 5/235*    (2006.01)
(Continued)

(52) U.S. Cl.
CPC .............. *G01J 1/44* (2013.01); *G06F 13/28* (2013.01); *H04N 5/2357* (2013.01); *G01J 2001/4247* (2013.01); *G01J 2001/444* (2013.01)

(58) Field of Classification Search
CPC ............. G01J 1/44; G01J 2001/444; G01J 2001/4247; H04N 5/2357; H04N 5/235;
(Continued)

(56) References Cited

U.S. PATENT DOCUMENTS

| 5,705,988 A | 1/1998 | McMaster |
| 2009/0179768 A1 | 7/2009 | Sander et al. |

(Continued)

FOREIGN PATENT DOCUMENTS

| CN | 101776479 A | 7/2010 |
| WO | 2008123865 A1 | 10/2008 |
| WO | 2010099331 A2 | 9/2010 |

OTHER PUBLICATIONS

Junger, Bernhard, International Search Report and Written Opinion of the International Searching Authority, for counterpart application PCT/US2018/035536, dated Nov. 12, 2018, European Patent Office, Rijswijk, the Netherlands, 18 pages.
Chang, Gary et al., "A Digital Implementation of Flickermeter in the Hybrid Time and Frequency Domains," IEEE Transactions on Power Delivery vol. 24, No. 3, Jul. 2009, pp. 1475-1482.
(Continued)

*Primary Examiner* — John R Lee
(74) *Attorney, Agent, or Firm* — Yutian Ling

(57) ABSTRACT

Techniques are disclosed for measuring an amount of flicker produced by a light source. In one embodiment, a flicker measuring device includes a photo sensor to measure the amount of light produced by the light source, a dedicated processor to receive and process data from the photo sensor, a memory bus coupled to an analog-to-digital converter (ADC) and to a first memory, and a direct memory access (DMA) bus coupled to the ADC and to a second memory. In another embodiment, a flicker measuring system uses a light sensor, an associated circuit and a portable computing device (PCD), such as a smart phone, to measure an amount of flicker produced by a light source by sending an electrical signal from the light source and associated circuit via an audio output to an audio sub-system of the PCD, so that the PCD may calculate the flicker value.

18 Claims, 15 Drawing Sheets

(51) Int. Cl.
*G06F 13/28* (2006.01)
*G01J 1/42* (2006.01)

(58) Field of Classification Search
CPC ...... G06F 13/28; G06F 13/282; G06F 13/285; G06F 13/287
See application file for complete search history.

(56) References Cited

U.S. PATENT DOCUMENTS

| | | | |
|---|---|---|---|
| 2009/0180353 A1 | 7/2009 | Sander et al. | |
| 2009/0180659 A1 | 7/2009 | Sander et al. | |
| 2010/0153622 A1* | 6/2010 | Dai | G06F 12/0246 711/103 |
| 2013/0147394 A1* | 6/2013 | Macknik | G01J 1/18 315/307 |
| 2016/0373866 A1 | 12/2016 | Novak | |
| 2017/0031182 A1 | 2/2017 | Novak | |
| 2018/0348051 A1* | 12/2018 | Safaee | H04N 5/2357 |

OTHER PUBLICATIONS

Piekarz, Marcin et al., "Comparative Tests of Flickermeters," 2002 10th International Conference on Harmonics and Quality of Power, IEEE, pp. 220-227.

Diekl, D.J., "White Paper: Flicker Standards Used by PMI Recorders," Power Monitors, Inc., Jul. 27, 2011, available at http://library.powermonitors.com/blog/flicker-standards-used-by-pmi-recorders.

Gallo, Daniele, "IEC Flickermeter Response to Interharmonic Pollution," 2004 11th International Conference on Harmonics and Quality of Power, IEEE, pp. 489-494.

LIS3DH MEMS digital output motion sensor ultra low-power high performance 3-axes "nano" accelerometer, STMicroelectronics, May 2010, 42 pages, available at http://www.st.com/resource/en/datasheet/lis3dh.pdf.

MMA8452Q, 3-axis, 12-bit/8-bit digital accelerometer Data Sheet, NXP Semiconductors, Rev. 10, Apr. 2016, available at http://www.nxp.com/docs/en/data-sheet/MMA8452Q.pdf.

* cited by examiner

DEVICE AND SYSTEM FOR MEASURING FLICKER

FIELD OF THE DISCLOSURE

The present disclosure relates to techniques for measuring an amount of flicker produced by a light source.

BACKGROUND

Flicker is a term that describes the visually perceivable modulation of light of the source, or illuminated objects. The human eye has its maximum sensitivity at a flicker frequency of about 10 Hz and drops to negligible values above about 100 Hz. However, in general the sensitivity depends upon various aspects such as light level, viewing angle, task to be performed, and the individual viewing the light source or object. There is a growing health concern about the effects of lighting quality, and in particular the flicker from a light source, especially in young children and babies.

DETAILED DESCRIPTION

Figure 1:
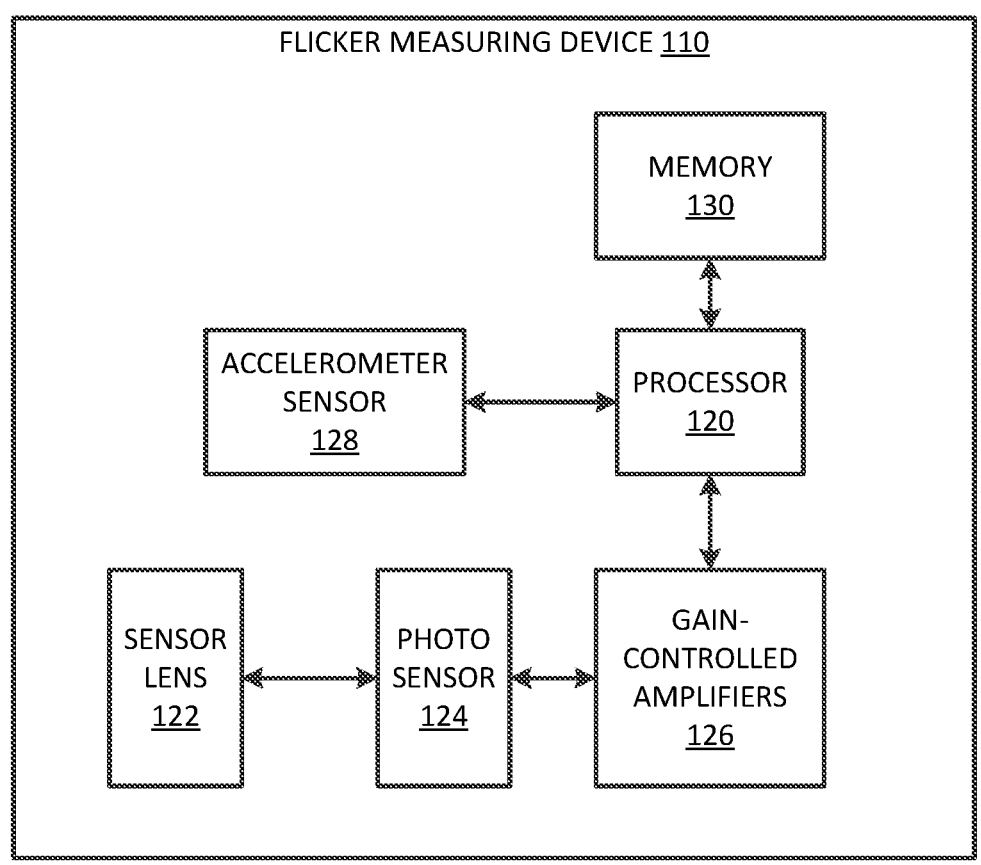
FIG. 1 illustrates a block diagram of a device for measuring an amount of flicker produced by a light source, in accordance with an example embodiment of the present disclosure.

Techniques for measuring an amount of flicker produced by a light source are disclosed. The techniques may be implemented in any number of devices, as will be appreciated in light of this disclosure. According to an embodiment, a flicker measuring device is capable of determining an amount of flicker produced by the light source and providing various figures of merit to quantify the flicker. In one embodiment, the flicker measuring device uses a photo sensor to measure or otherwise sample the quality of light produced by the light source, a dedicated direct memory access (DMA) bus, and a dedicated processor to receive and process the data from the photo sensor. The flicker measuring device combines the optical sensor and the data sampling into a streamlined dedicated device that is portable and a reliable measurement tool for quantifying the quality of light generated by a light source. The flicker measuring device provides dedicated optics, hardware and firmware for fast, precise, and repeatable flicker measurement. The flicker measuring device is also capable of calculating different flicker metrics results with various packaging form factors and levels of integration. In some embodiments, an onboard hardware-microprocessor is powerful enough to perform the analog-to-digital conversion and sampling and storing without interrupting the firmware execution. In some such cases, a dedicated DMA embedded hardware automatically transfers the sampled data to a low latency (e.g., zero-wait, or 0-wait) random access memory (RAM) without interrupting firmware execution. A repeatable sampling period is implemented to eliminate or otherwise reduce any adverse effects of non-uniform sampling and to avoid false positive flicker detection. An acceleration sensor may be implemented to account for sudden movements or vibrations of the flicker measuring device, according to some embodiments. Having an acceleration sensor helps ensure that any non-stationary movements are detected and accounted for to help ensure validity of the measurement result According to another embodiment of the present disclosure, a system for measuring an amount of flicker produced by a light source includes a light sensor, associated light sensor circuit, and a portable computing device. The flicker measuring system uses a portable computing device (PCD), such as a smart phone, and a light source and associated circuit that may be plugged into the PCD. The flicker measuring system includes a light sensor and associated light sensor circuit that are used to collect flicker value data and provide the data to the PCD for further storing and/or analysis. The light sensor and associated light sensor circuit may be provided in a housing that has an audio output that may be inserted into the audio port of a PCD. The light sensor and circuit housing may also include a USB output for interfacing with a USB of the PCD. Accordingly, the housing may be connected to the audio-only or both audio and USB of the PCD. The light sensor and associated circuit includes a light sensor that receives light and converts it into an electrical signal, an amplifier that converts the electrical signal into an amplified voltage signal, a low-pass filter that removes unwanted noise, and a signal limiter that limits the amount of voltage output by the voltage signal. An audio output of the light sensor and associated circuit provide the voltage signal to an audio sub-system of the PCD.

General Overview—Flicker Measuring Device

Implementing a device that measures an amount of flicker produced by a light source involves a number of non-trivial issues. For example, some existing devices require stationary positioning between the light source under measurement and the device measuring the amount of flicker. This results in erroneous flicker detection in which there are sudden movements or vibrations of the device measuring flicker. There are standards that measure an amount of flicker and/or conform multiple sources to a common/same flicker level. However, these standards may vary and many devices measure flicker as a function of an electrical property of the overall circuit. A device that measures an electrical property of the current flowing through, or voltage measured across, a light source to determine an amount of flicker does not accurately portray the quality of light coming from a light source. Furthermore, many of such devices operate by processing large volumes of data, and the processing may take time, and therefore data may potentially be lost. There is a need in some instances, for a portable and reliable measurement tool to quantify the quality of light generated by a light source based on the emitted light.

Thus, and in accordance with an embodiment of the present disclosure, a flicker measuring device is provided for determining the quality of light of a light source. The flicker measuring device includes a dedicated photo sensor, a gain-controlled amplifier operatively connected to the photo sensor, and a processor including an analog-to-digital converter, according to one such embodiment. The gain-controlled amplifier amplifies a signal from the photo sensor to provide an amplified signal. The amplified signal is provided to the analog-to-digital converter of the processor, which receives the amplified signal and generates a corresponding digital signal. The digital signal is then transferred by the processor over a DMA bus to a memory (for example, a zero-wait or low latency RAM) for storage. Thus, the processor may transfer data via the DMA bus from the analog-to-digital converter to the storage automatically and rapidly without interruption to other processes or routines that may be executing in the processor. The processor may transfer data via a memory bus, separate from the DMA bus, for performing other processes and routines that may be executing in the processor. The processor may be implemented, for example, as a microcontroller configured with an analog to digital converter, the DMA bus, the memory bus, central processing unit (CPU) with integrated floating processing unit (FPU), one or more memory facilities (e.g., Flash, ROM, RAM), and input/output (I/O) capability. The data is ready when required and a low-latency processing is possible, with no or little intermittency in the sampling time or data arrival. The optics and the sampling may be packaged or otherwise provided in one device, thereby further enhancing efficiency of the overall system.

The flicker measuring device according to an embodiment of the present disclosure is configured to measure a light property of the light source using a photo sensor of the device. Note that this is not measuring an electrical property, such as current or voltage, of the lighting circuit itself, but rather the quality of light emitted from the light source, as measured by the photo sensor and automatically sent via the DMA bus to a low-latency memory (e.g., 0-wait RAM) for further processing. By measuring the light property, flicker measurement accuracy is improved, as will be appreciated in light of the present disclosure.

The flicker measuring device may also implement a calibration technique that includes radiating the device with a light having known characteristics and a known spatial configuration. The resulting calibration data is then received by the flicker measuring device, and may be stored by the flicker measuring device. Optionally, the device may be validated, after calibration, to ensure that the device provides the correct results by exposing the device to known light conditions and sequences.

Numerous packaging and form factors will be appreciated in light of this disclosure. In accordance with an embodiment, the device may be implemented as an application specific integrated circuit (ASIC) chip having some or all of the components of the flicker measuring device. One example ASIC chip embodiment includes an accelerometer, photo sensor and gain-controlled amplifiers integrated within the ASIC and a separate communication driver provided external to the ASIC. Another example chip embodiment includes the accelerometer, photo sensor, gain controlled amplifiers, and the communication driver integrated within the ASIC.

Device Architecture—Flicker Measuring Device

FIG. 1 illustrates a block diagram of a device for measuring an amount of flicker produced by a light source, configured in accordance with an example embodiment of the present disclosure. In accordance with an embodiment, the flicker measuring device 110 includes an embedded processor 120, a sensor lens 122, a photo sensor 124, one or more gain-controlled amplifiers 126, and memory 130. In some embodiments the flicker measuring device 110 includes an accelerometer sensor 128. These components may be configured and arranged in accordance with one or more of the embodiments disclosed below. Depending upon the number of components ordered and/or the particular application for which the device will be utilized, the components may be spread across one or more printed circuit boards (PCBs) and may have various components integrated and embedded as appropriate, for example in an ASIC chip. The flicker measuring device provides various outputs of figures of merit for quantifying the flicker. Examples of different figures of merit include the ISO 61000 standard, the IEC 61000-4-15 standard, or a Kelly-Henger flicker value, which may be calculated according to one or more techniques disclosed in the present disclosure.

In an embodiment, the sensor lens 122 provides the appropriate lens for the photo sensor 124, which measures a light property of a light source. The gain-controlled amplifiers 126 provide the gain control for the signal from the photo sensor 124 to provide an amplified signal to the processor 120. The processor 120 works with memory 130 to store and retrieve data from the various storage locations within memory, as will be described in further detail below.

In some embodiments, the flicker measuring device 110 includes an accelerator sensor 128 that measures movements of the flicker measuring device 110 in at least an X- and Y-direction, and may also measure movements in a Z-direction of movement. Meaning, the accelerometer may measure movements in a side-to-side ("X") direction, an up-and-down ("Y") direction, and also back-and-forth (or toward and away, "Z") direction. The data from the accelerometer sensor 128 may be used by the processor 120 to discount for movement of the flicker measuring device 110 that could interfere with the measurement data. For example, if movement or a change in position is detected, this movement data, or positional data, may be used by the processor to account for the movement and ensure that the movement is taken into account when calculating a figure of merit for the quality of light.

Device Architecture—Components on Two Circuit Boards

Figure 2:
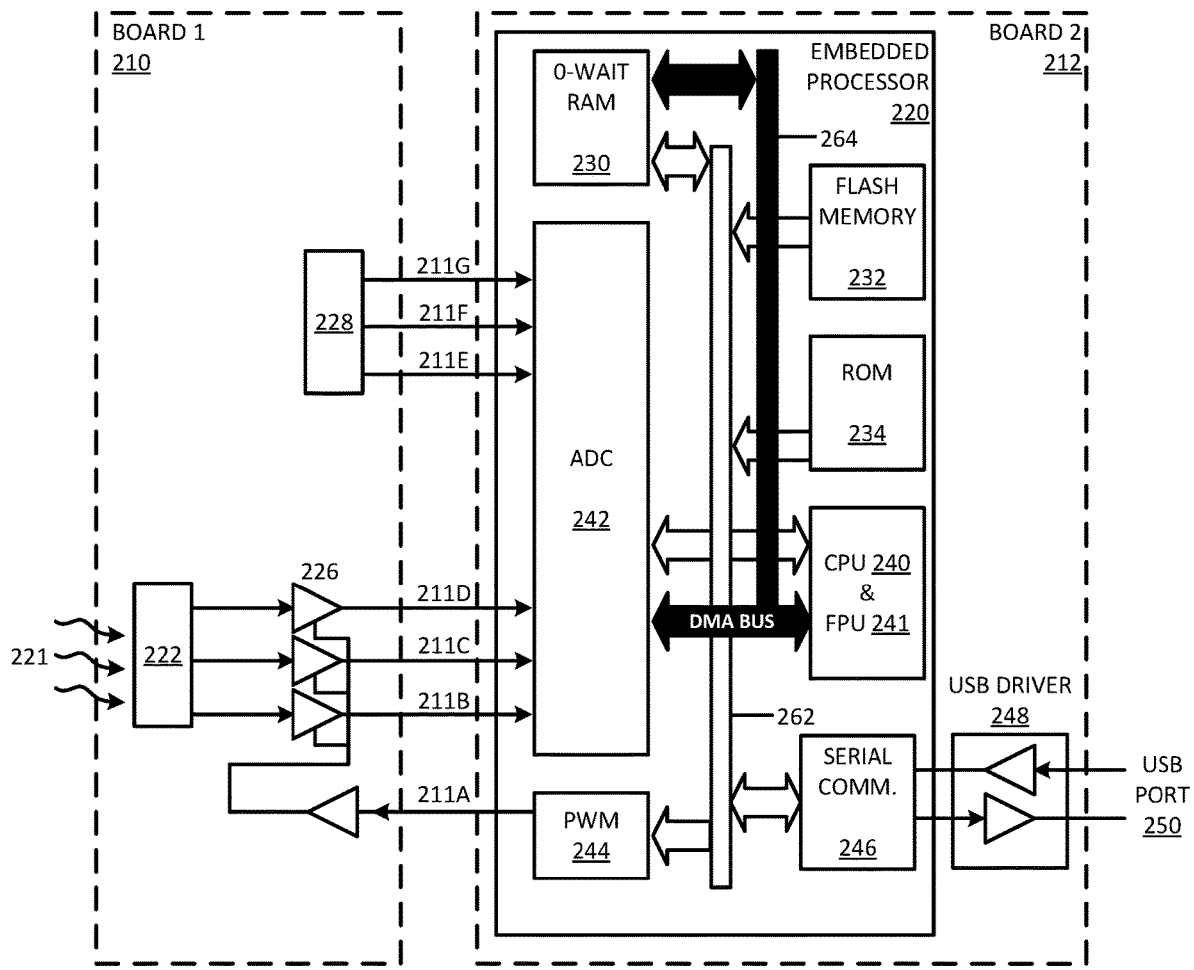
FIG. 2 illustrates a detailed schematic diagram of a device for measuring an amount of flicker produced by a light source, in accordance with an example embodiment of the present disclosure, in which the components are split between a first printed circuit board (PCB) and a second PCB.

FIG. 2 illustrates a detailed schematic diagram of a device for measuring an amount of flicker produced by a light source, configured in accordance with an example embodiment of the present disclosure. In this embodiment, the components are split between two printed circuit boards (PCBs). Board 1 (210) includes a photo sensor 222, gain-controlled amplifiers 226, and the accelerometer sensor 228. Board 2 (212) includes the embedded processor 220 having a low latency (e.g., 0-wait) RAM 230, flash memory 232, read only memory (ROM) 234, CPU 240 and FPU 241, an analog-to-digital converter (ADC) 242, a pulse width modulation (PWM) interface 244 and a serial communication interface 246. The FPU may be a co-processor that is integrated into the CPU, for example as an integrated circuit, or may be an add-on component that communicates with the CPU to perform the processing of data, as will be appreciated in light of the present disclosure. The board 2 (212) also includes a Universal Serial Bus (USB) driver 248 operatively connected to a USB port proximate an external edge of the board 2 (212). The USB driver 248 may be any appropriate serial communication driver that interfaces the processor to a serial communication port, as will be appreciated. The board 1 (210) and board 2 (212) may be connected to each other via any appropriate board-to-board connector, such as a ribbon connector, and may include a plurality of communication wires, shown by wires 211A, 211B, 211C, 211D, 211E, 211F and 211G. As shown, communication wire 211A transfers data from the PWM interface 244 to the gain-controlled amplifiers 226; communication wires 211B, 211C and 211D transfer data from the gain-controlled amplifiers 226 to the analog-to-digital converter 242; and communication wires 211E, 211F and 211G transfer data from the accelerometer sensor 228 to the analog-to-digital converter 242, in accordance with an embodiment of the present disclosure.

A memory bus 262 is coupled to the low latency RAM 230, a flash memory 232, a ROM 234, a CPU 240 and a floating point unit (FPU) 241, the analog-to-digital converter 242, the pulse width modulation interface 244 and the serial communication interface 246. The memory bus 262 is used for performing processes and routines on the flicker measuring device. The DMA bus 264 is coupled to the analog-to-digital converter 242, the low latency RAM 230 and to the CPU 240 and FPU 241. The DMA bus 264 allows the digital signal to be directly transferred to the low latency RAM 230 without interruption from other processes and routines that may be executed in the processor. In some embodiments, the DMA bus 264 is not coupled to the flash memory 232, the ROM 234, the PWM 244, or the serial communication interface 246, so as to only provide path for data from the ADC 242 to RAM 230 and the CPU 240 and FPU 241. The memory bus 262 is responsible for transferring data to and from the various elements to which it is coupled, so as to allow the DMA bus 264 to transfer the sampled data directly to the low latency RAM 230 without interruption from the memory bus 262 and elements coupled thereto, as will be appreciated in light of the present disclosure.

Note that although specific types of nonvolatile memory locations (i.e., flash memory and ROM) are disclosed, other types of nonvolatile memory facilities may be implemented, and likewise although specific types of volatile memory locations are disclosed (i.e., 0-wait RAM), any appropriate volatile type of memory may be implemented.

In accordance with an embodiment of the present disclosure, the processor 220 is powerful enough to perform the analog-to-digital conversion and sampling and storing process, without interrupting other processes or routines that may be executing in the processor. A dedicated DMA embedded hardware bus 264 automatically transfers the sampled data from the analog-to-digital converter 242 to the low latency (e.g., 0-wait) RAM 230 without interrupting software execution. A precise and repeatable sampling period is implemented to eliminate the adverse effects of non-uniform sampling and to avoid false positive flicker detection. The sampling period implemented by the microprocessor is a substantially high sampling rate which is transferred using the dedicated DMA bus 264 to the 0-wait RAM 230. In an example embodiment, the 0-wait RAM 230 includes two memory banks (i.e., partitions within the memory), in which a first memory bank feeds the data so that it is available as soon as it is needed, and the other memory bank performs the processing. According to a zero-wait RAM embodiment having two memory banks, the digital signal from the ADC 242 may be transferred directly to a first memory bank within the zero-wait RAM 230 while data is read out from the second memory bank of the zero-wait RAM 230 over the memory bus 264. The partitions may be identical or substantially similar to each other, as will be appreciated in light of the present disclosure. Once the first memory bank is full, and/or when the processing of the data within the second memory bank is complete, the memory may be swapped so that the second memory bank is then filled by the ADC 242 and the first memory bank is accessed by the CPU 240. This swap may continue as long as desired or until all of the data has been gathered and processed. Thus, there is little or no delay in time domain or in frequency domain by providing a dedicated DMA bus and a 0-wait RAM 230 having two memory banks. This also allows two hardware components (the ADC 242 and the CPU 240) to operate independently at the same time, as will be appreciated in light of the present disclosure.

The photo sensor 222 is an optical sensor that provides a precise measurement of a light property of light waves 221 propagating from a light source onto the photo sensor 222, according to an embodiment. The sampling rate of the photo sensor 222 is constant and also fast in accordance with the teachings disclosed herein. For example, the photo sensor 222 in an embodiment may perform sampling in the tens of kilo-samples per second.

The accelerometer sensor 228 is used to detect motion of the device, in accordance with an example embodiment. The processor 220 may detect movement from data that the processor 220 receives from the accelerometer sensor 228 and invalidate the movement results. The accelerometer sensor 228 may be configured to detect a movement of the flicker measuring device, and provide movement data, for example as an acceleration signal, to the processor 220. The analog-to-digital converter 242 is further configured to generate a digital movement signal from the acceleration signal, and apply the digital movement signal to the digital signal (from the light source) to account for movement of the flicker measuring device, in accordance with an example embodiment. In some embodiments, the accelerometer sensor 228 may measure the level of acceleration and, if the acceleration is below a threshold, then a lookup-table of correction factors may be implemented by the processor 220 in order to correct the measured level of acceleration. For example, the level of acceleration may be measured, and if below a threshold, a lookup table of correction factors may be implemented in the software in order to correct the digital signal, considering the level of acceleration. The accelerometer sensor 228 may be integrated as part of the ASIC, or the processor may communicate with existing accelerometer chips. In some embodiments, the accelerometer sensor 228 provides specific acceleration data to the processor. The accelerometer sensor 228 may be integrated as part of the embedded processor or the processor may communicate with existing accelerometer chips of a device. The accelerometer sensor 228 may detect any movement, a threshold speed of movement, or a specific speed of movement parameter (i.e. velocity) depending upon the particular application, in accordance with the techniques of the present disclosure.

In some embodiments, the accelerometer sensor 228 may be replaced with a camera. In embodiments with a camera, image processing may be performed to detect motion of the device relative to other objects in the field of view of the camera. The image processing may include tracking light sources (i.e. particularly bight and/or dark objects or another feature of interest) and assess whether or not the system moves, and how fast it moves. The camera may be configured to provide positional data or movement data regarding the flicker measuring device to the processor, in accordance with an example embodiment.

In an embodiment, the analog-to-digital converter 242 is a high resolution high speed converter, having a high number of bits. Thus, the quantization of light intensity is very fine, which reduces the possibility of having a false flicker due to quantization errors, in accordance with an embodiment.

As shown in the embodiment of FIG. 2, a dedicated DMA bus 264 transfers the sampled data to storage (e.g., the 0-wait RAM 230), without interference from components of the processor 220. The CPU 240 is a dedicated and powerful CPU that operates with no interrupts to ensure preciseness of the processing timing. The CPU is high speed to process the fast-pace high-precision samples in the intervals between the samplings.

The CPU 240 uses the dedicated DMA embedded hardware bus 264 to automatically transfer the sampled data from the analog-to-digital converter 242 to the 0-wait RAM 230. The data is then ready when it is needed for processing, and this provides a precise processing of data.

In an embodiment, the embedded processor 220 also includes a FPU (floating point unit) 241 which is a specialized co-processor that manipulates numbers more quickly than basic microprocessor circuitry. The FPU 241 accomplishes fast processing by implementing instructions that focus entirely on large mathematical operations. A FPU 241 may process numbers more quickly than a conventional CPU and processing is further improved with the combined CPU 240 and FPU 241, in which the DMA bus 264 automatically transfers the sampled data to a low latency volatile memory (e.g., RAM 230), the CPU performs other functions and routines of the flicker measuring device, and the FPU 241 processes the sampled data that has been stored, in accordance with an embodiment.

There are a number of techniques that may be implemented to provide a flicker value that is based on the sampled data stored in the 0-wait RAM 230. It is desirable for the data to be as recent (i.e., current) as possible, and thus it is important to reduce any delay in transfer or storage of the sampled data. The dedicated DMA bus 264 provides the rapid transfer of data to the 0-wait RAM 230, with little or no latency and the memory bus 262 may be used to transfer data to and from the ROM 234, in accordance with an embodiment. In an embodiment, the dedicated DMA bus 264 is not coupled to the ROM 234 and thus is free of interruptions and wait times that may result from performing other system functions and routines, which are carried out using the memory bus 262, as will be appreciated in light of the present disclosure.

Calculating Flicker Value

A time varying light signal, S(t), for example as shown in Equation 1 below, may be analyzed to determine the flicker value. According to Equation 1, element A represents the amplitude of the carrier signal, $b_f$ represents the modulation amplitude, f is the frequency, and t is the time:

$$S(t) = A + b_f \sin(2\pi f t) \qquad \text{Equation 1}$$

The perceived flicker value, FV[S], of the time varying light signal may be determined, for example, according to Equation 2 below. Equation 2 multiplies the modulation depth, $$\frac{b_f}{A},$$

by the Kernel Function, K(f), which is a sensitivity function of the human eye to flicker.

$$FV[S] = \frac{b_f}{A} K(f)$$

Equation 2

Example Kernel Functions are shown below for both time domain approach and the frequency domain approach. Refer, for example, to Equations 3-7 for example time domain approaches to calculating a flicker value and to Equation 8 for an example frequency domain approach, in accordance with one or more embodiments of the present disclosure.

Time Domain Approach

The flicker value is fundamentally defined through a weighted sum of modulation amplitudes (raised to some power) at all frequencies which exist in the signal. For example, the time domain data, $d_t$, may be expressed as the following form, shown in Equation 3:

$$d_t = \langle d_t \rangle + \Sigma_f m_f \sin(2\pi f t) \qquad \text{Equation 3}$$

In the above equation, $m_f$ is the modulation amplitude at frequency f and $\langle d_t \rangle$ is the average over time, t, of the time domain data. The IEC flicker value may thus be calculated according to the following Equation 4:

$$FV_{IEC} = \frac{\sum_f R_{IEC,f}^2 m_f^2}{\langle d_t \rangle^2} \quad \text{Equation 4}$$

In Equation 4 above, the $R_{IEC,f}$ is the IEC flicker frequency response function at frequency f. The modulation amplitude, $m_f$, and average over time t of time domain data, $\langle d_t \rangle$, are also included in Equation 4. The IEC flicker value, $FV_{IEC}$, may then be calculated using Equation 4 from the memory stored in the 0-wait RAM.

It is also possible to calculate the Kelly-Henger based flicker value, which has a different response function, $R_{KH,f}$, and also considers the square root of the weighted sums of squares, according to Equation 5 below (in which the variables are the same as Equation 4):

$$FV_{KH} = \sqrt{\frac{\sum_f R_{IEC,f}^2 m_f^2}{\langle d_t \rangle^2}} \quad \text{Equation 5}$$

In analyzing the data, one or more flicker values (i.e., IEC, Kelly-Henger, or another figure of merit) may be calculated for a plurality of sampled data points continuously as the data is stored in the 0-wait RAM 230. The digital signal representing the light signal may be stored in RAM as a plurality of sampled data points, in accordance with an embodiment. The flicker values are thus accurate and precise, given that there is no delay between transferring and storing the data, and then processing the data.

Convolution Approach in Time Domain

Figure 2A:
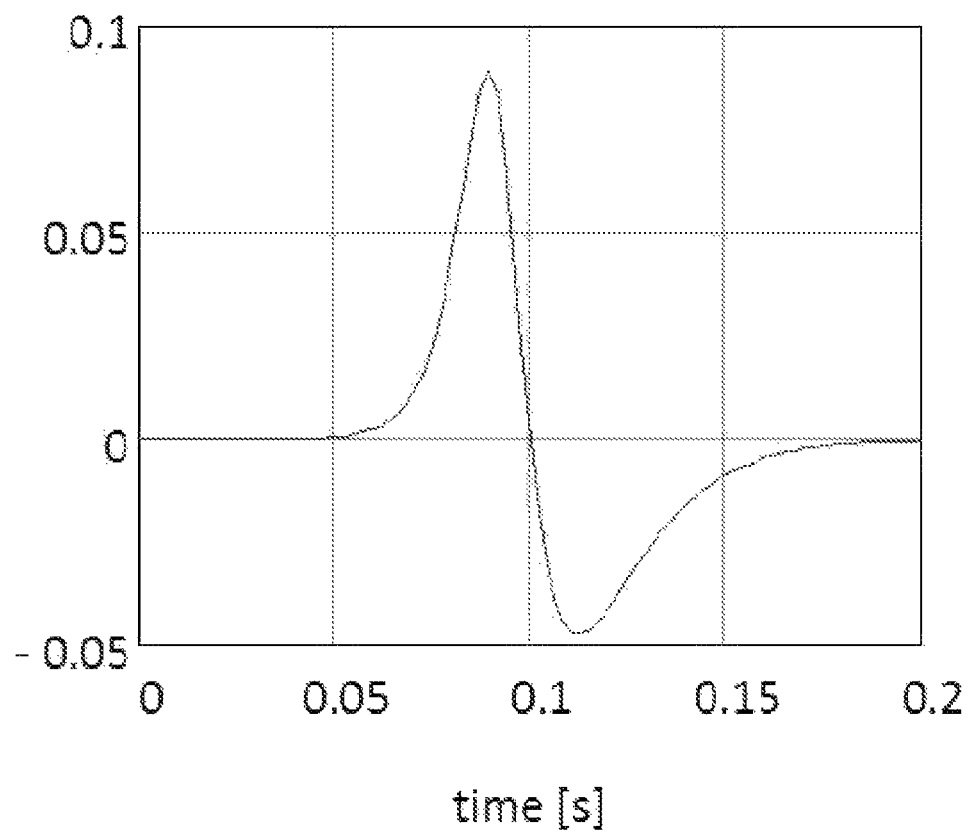
FIG. 2A illustrates an example Kernel Function in time domain, in accordance with an example embodiment of the present disclosure.

In accordance with an embodiment of the present disclosure, a two-step convolution approach may be used to calculate flicker value. First, a convolution formula (shown in Equation 6) for flicker value is provided, and second an averaging is performed, as shown in Equation 7. The Kernel Function K(τ) is the sensitivity function in time domain. One example Kernel Function in time domain is shown in FIG. 2A.

An example convolution formula for calculating flicker value is shown in Equation 6, in which K(τ) is the Kernel function in time domain, S(t−τ) is the time varying light signal and $d_t$ is the time domain data.

$$CONV^2(t) = \left| \frac{1}{\langle S(T) \rangle} \int_{-t_w}^{0} d_\tau K(\tau) S(t-\tau) \right|^2 \quad \text{Equation 6}$$

Then, in a second step, an averaging is performed according the equation 7, which provides the flicker value $FV^2[S]$:

$$FV^2[S] = \langle \langle CONV^2(t) \rangle_\alpha \rangle_\alpha \quad \text{Equation 7}$$

The averaging of the convolution formula provides a flicker value, which may be implemented by the processor (for example the FPU of the embedded processor according to one or more embodiments of the present disclosure). The flicker value may thus be calculated using Equations 6 and 7, in accordance with an embodiment.

Frequency Domain Approach

In accordance with an embodiment of the present disclosure, a time varying light signal may be analyzed to determine the flicker value. A complex time varying light signal is shown in Equation 8, in which A is the amplitude, $b_{f_k}$ is the spatially resolved light levels, f is the frequency and t is the time.

$$S(t) = A + \sum_k b_{f_k} \sin(2\pi f_k t) \quad \text{Equation 8}$$

The perceived flicker value (FV) is the accumulation of spectrally resolved light levels ($b_{f_k}$) weighted by a Kernel Function K(f) for each frequency, f. The flicker value may be calculated according to the following equation 9, in which A is the amplitude:

$$FV[S] = \frac{1}{A} \sqrt{\sum_k K^2(f_k) b_{f_k}^2} \quad \text{Equation 9}$$

Figure 2B:
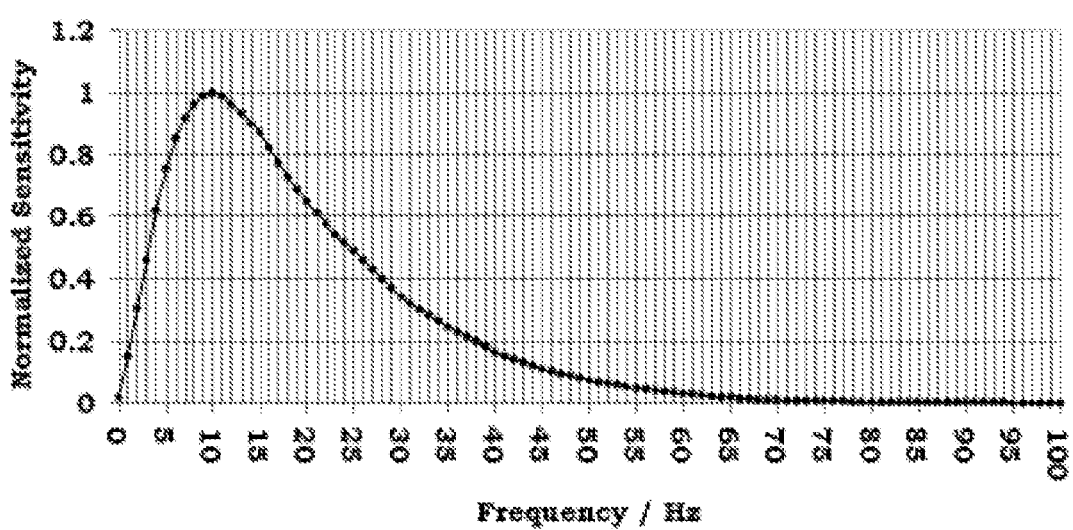
FIG. 2B illustrates an example Kernel Function in frequency domain, in accordance with an example embodiment of the present disclosure.

Thus, the flicker value may be calculated by implementing the above equation in a frequency domain approach. The Kernel Function K(f) is the sensitivity function in frequency domain. An example Kernel Function in frequency domain is shown in FIG. 2B.

Thus, in accordance with some embodiments of the present disclosure, the flicker perception level may be calculated in either time domain or frequency domain, depending upon the particular application and light source being measured, according to one or more of the equations disclosed herein. It will be appreciated in light of the present disclosure that these are only example equations, and other equations for calculating flicker may be implemented in accordance with the teachings of the present disclosure. The processor (for example the FPU 241, 441 or 741 as disclosed herein) applies one or more of the equations to the digital signal or digital data stored in RAM (for example RAM 230, 430 or 730) to calculate the flicker value, as will be appreciated in light of the present disclosure. The flicker value may be calculated in time domain or in frequency domain using any arrangement of the flicker measuring device, in accordance with one or more embodiments of the present disclosure.

Device Architecture—Example Implementation—Components on Two Circuit Boards

Figure 3:
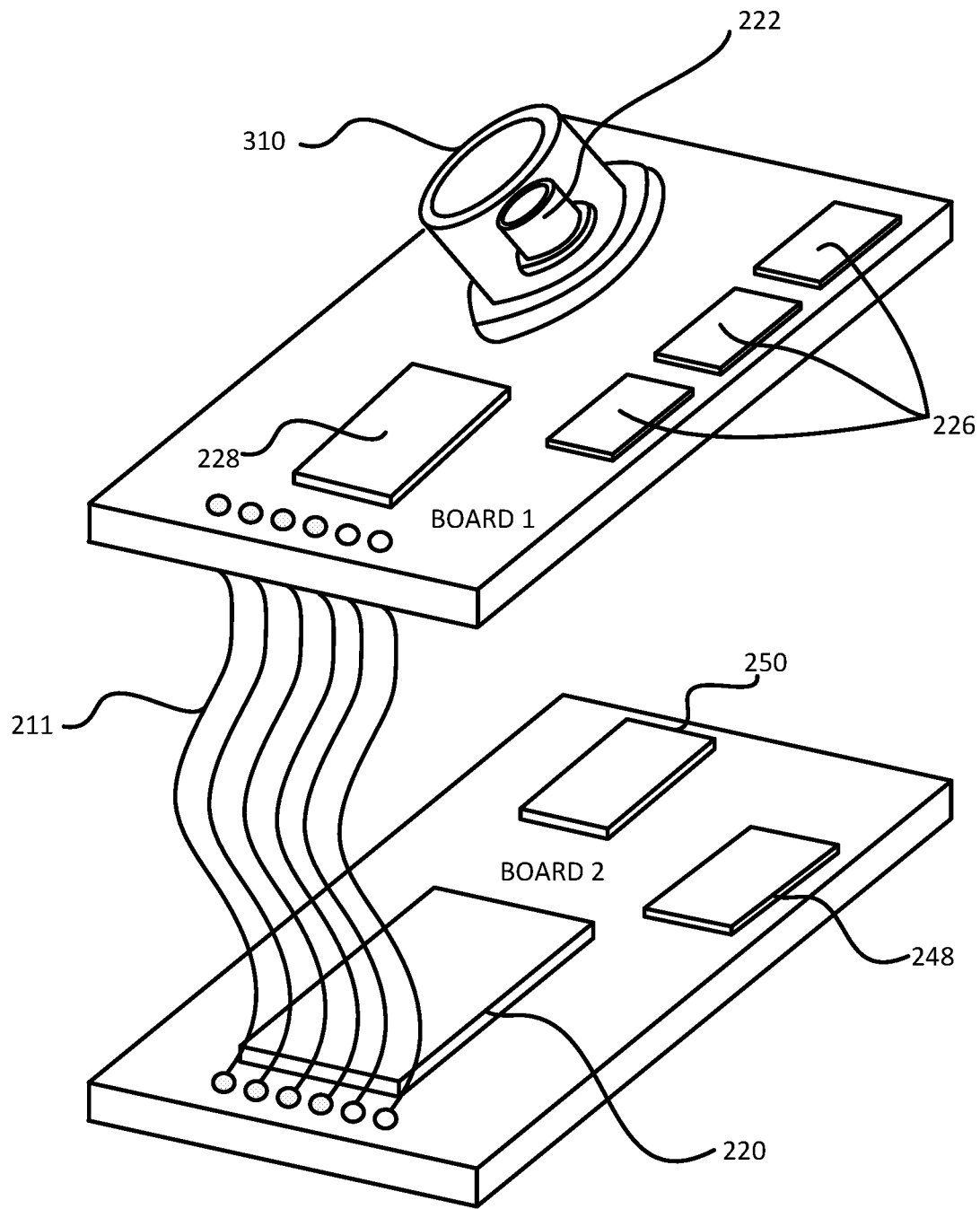
FIG. 3 illustrates a perspective view of an example implementation including the device shown in FIG. 2, in accordance with an example embodiment of the present disclosure.

FIG. 3 illustrates a perspective view of an example implementation including the device shown in FIG. 2, configured in accordance with an example embodiment of the present disclosure. As shown, a sensor lens 310 for the photo sensor 222 is provided on the board 1, along with the gain-controlled amplifiers 226 and the acceleration sensor 228. The second board (board 2) includes the processor 220, USB driver 248 and USB port 250. Communication between board 1 and board 2 is accomplished by communication wires 211, which transfer signals between the first board and the second board. The communication wires 211 are shown as a ribbon connector, but any board-to-board connector may be implemented, as will be appreciated. In an embodiment, the wires 211 may include the communication wires 211A. 211B, 211C, 211D, 211E, 211F and 211G, as shown in FIG. 2.

Device Architecture—Components on Single Board

Figure 4:
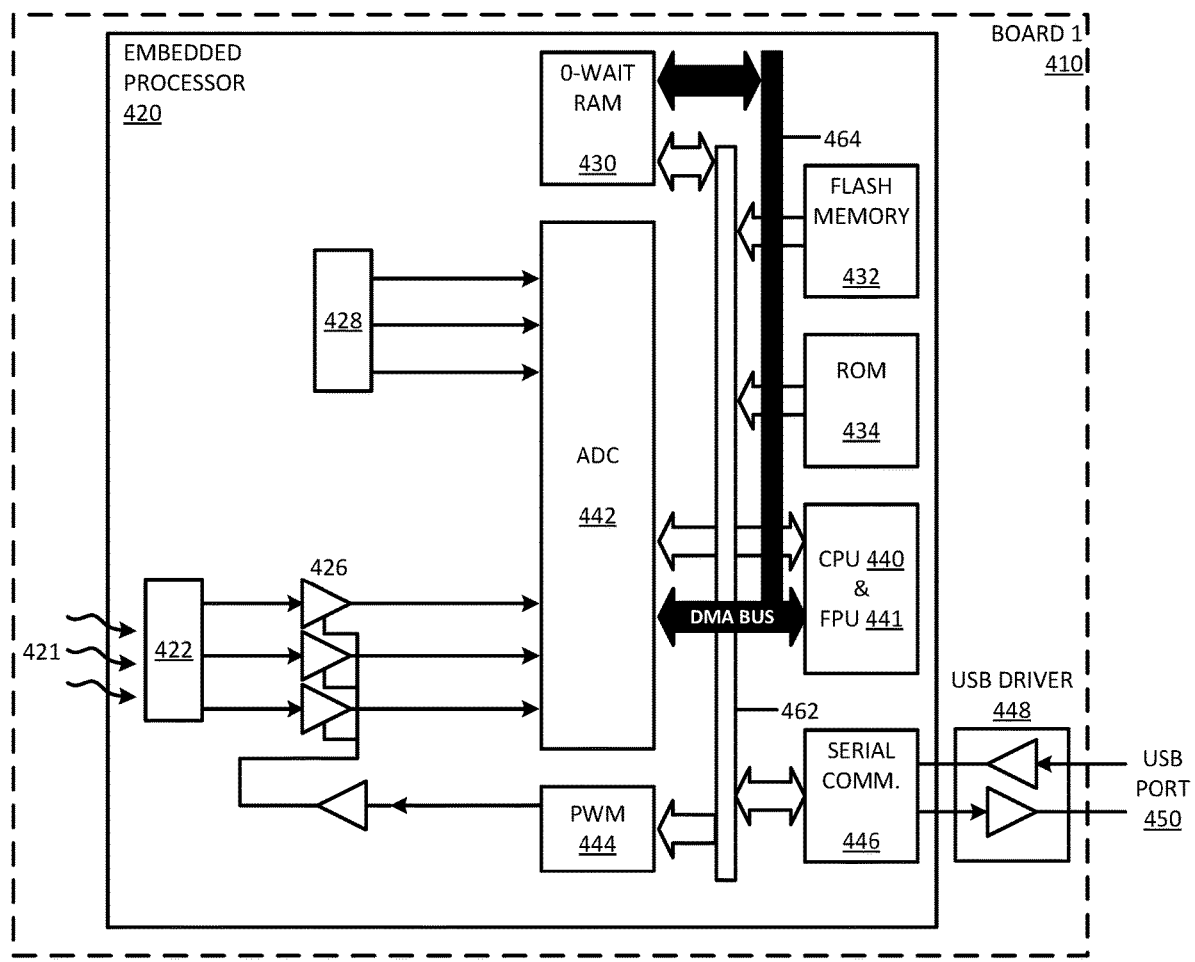
FIG. 4 illustrates a detailed schematic diagram of a device for measuring an amount of flicker produced by a light source, in accordance with an example embodiment of the disclosure, including an application-specific integrated circuit (ASIC) chip and an external communication driver.

FIG. 4 illustrates a detailed schematic diagram of a device for measuring an amount of flicker produced by a light source, configured in accordance with an example embodiment of the disclosure, including an ASIC chip and an external communication driver on PC board 1 (410). In accordance with this configuration, the components that were on a second board in the embodiment of FIG. 2 are now included within the embedded processor 420 and all components are now on a single PC board 410. In accordance with this configuration of the present disclosure, the embedded processor 420 includes the photo sensor 422, the gain-controlled amplifiers 426, the acceleration sensor 428, the 0-wait RAM 430, the flash memory 432, the ROM 434, the CPU 440 and FPU 441, analog-to-digital converter (ADC) 442, PWM interface 444, serial communication interface 446, a memory bus 462 and a DMA bus 464. Also in accordance with this configuration, the USB driver 448 and USB port 450 are now on the same PCB 410 as the embedded processor 420; however they are not integrated within the processor 420. The photo sensor 422 provides a precise measurement of a light property of light waves 421 propagating from a light source onto the photo sensor 422, according to an embodiment.

A memory bus 462 is coupled to the low latency RAM 430, a flash memory 432, a ROM 434, a CPU 440 and FPU 441, the analog-to-digital converter 442, the pulse width modulation interface 444 and the serial communication interface 446. The memory bus 462 is used for performing processes and routines on the flicker measuring device. The DMA bus 464 is coupled to the analog-to-digital converter 442, the low latency RAM 430 and to the CPU 440 and FPU 441. The DMA bus 464 allows the digital signal to be directly transferred to the low latency RAM 430 without interruption from other processes and routines that may be executed in the processor. The memory bus 462 is responsible for transferring data to and from the various elements to which it is coupled, so as to allow the DMA bus 464 to transfer the sampled data directly to the low latency RAM 430 without interruption from the memory bus 462 and elements coupled thereto, as will be appreciated in light of the present disclosure.

In an embodiment, the embedded processor 420 also includes a FPU unit 441 which is a specialized co-processor that may process numbers more rapidly than a conventional CPU, which also performs all other functions and routines for a device. Processing is further improved with the combined CPU 440 and FPU 441, in which the FPU processes sampled data in memory, and the CPU 440 performs other functions and routines of the flicker measuring device, such as sending data to the serial communication interface.

Figure 5:
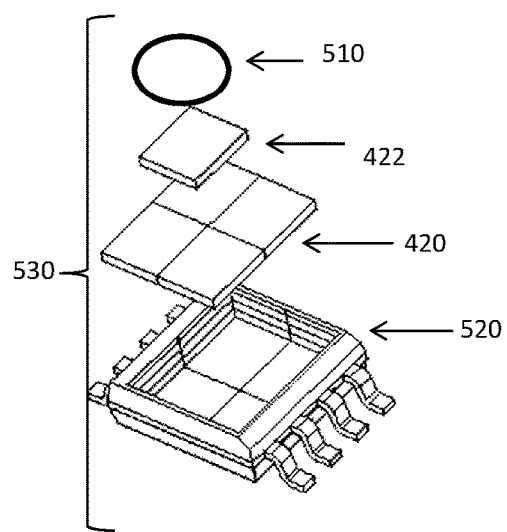
FIG. 5 illustrates an exploded view of an example implementation including the device shown in FIG. 4, in accordance with an example embodiment of the present disclosure.

FIG. 5 illustrates an exploded view of an example implementation including the device shown in FIG. 4, configured in accordance with an example embodiment of the present disclosure. The device for measuring flicker, collectively denoted by 530, includes a sensor lens 510, the photo sensor 422, embedded processor 420 and exterior packaging 520.

Figure 6:
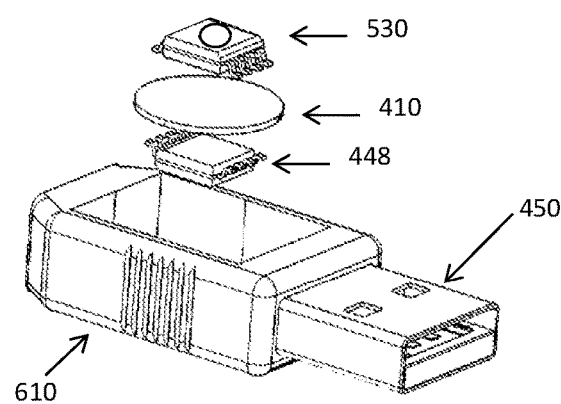
FIG. 6 illustrates an exploded view of a system including the example implementation shown in FIG. 5, in accordance an example embodiment of the present disclosure.

FIG. 6 illustrates an exploded view of a system including an example implementation including the device shown in FIG. 5, configured in accordance with an example embodiment of the present disclosure. The system includes the assembled device 530, which includes the sensor lens 510, photo sensor 422, embedded processor 420, and the external packaging 520. The system of FIG. 6 includes the PCB 410 and a USB driver 448. The components are embedded within an overall device 610 that provides an external USB port 450, in accordance with an embodiment of the present disclosure.

Figure 7:
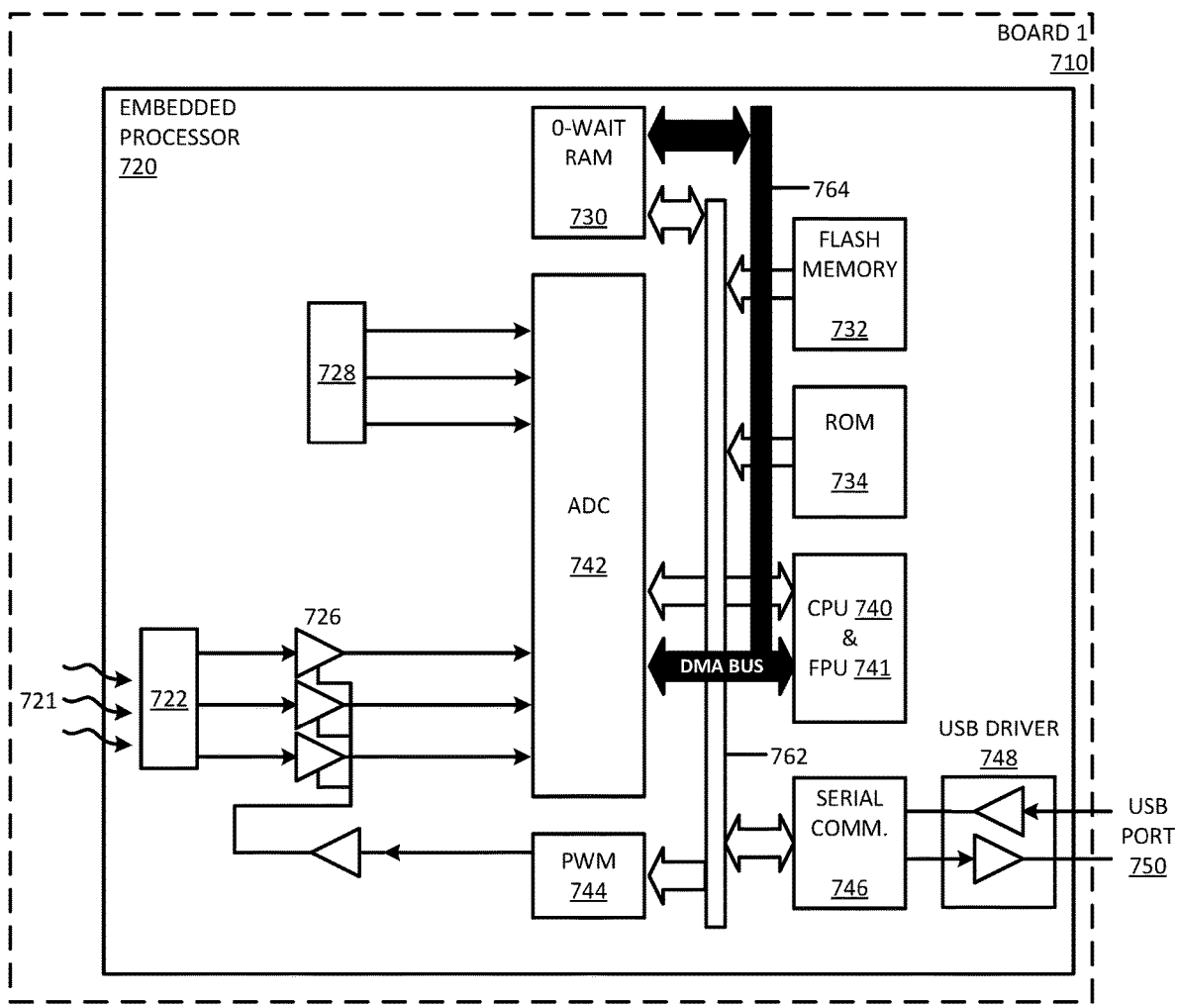
FIG. 7 illustrates a more detailed schematic diagram of a device for measuring an amount of flicker produced by a light source, in accordance with an example embodiment of the present disclosure, including an ASIC chip with integrated communication driver.

Device Architecture—Components on Single Board and USB Driver Integrated into Embedded Processor FIG. 7 illustrates a detailed schematic diagram of a device for measuring an amount of flicker produced by a light source, configured in accordance with an example embodiment of the present disclosure, including an ASIC chip with integrated communication driver. In this configuration of the present disclosure, the USB driver is embedded within the processor 720 to provide an application-specific integrated circuit (ASIC) chip having an integrated communication driver all enclosed within a single external packaging. With reference to FIG. 7, in accordance with an embodiment, the embedded processor 720 includes a photo sensor 722, gain-controlled amplifiers 726, an acceleration sensor 728, 0-wait RAM 730, flash memory 732, ROM 734, CPU 740 and FPU 741, analog-to-digital converter (ADC) 742, PWM 744, serial communication interface 746, USB driver 748, a memory bus 762 and a DMA bus 764, all disposed on a single PCB 710. The photo sensor 722 provides a precise measurement of a light property of light waves 721 propagating from a light source onto the photo sensor 722, according to an embodiment.

A memory bus 762 is coupled to the low latency RAM 730, a flash memory 732, a ROM 734, a CPU 740 and FPU 741, the analog-to-digital converter 742, the pulse width modulation interface 744 and the serial communication interface 746. The memory bus 762 is used for performing processes and routines on the flicker measuring device. The DMA bus 764 is coupled to the analog-to-digital converter 742, the low latency RAM 730 and to the CPU 740 and FPU 741. The DMA bus 764 allows the digital signal to be directly transferred to the low latency RAM 730 without interruption from other processes and routines that may be executed in the processor. The memory bus 762 is responsible for transferring data to and from the various elements to which it is coupled, so as to allow the DMA bus 764 to transfer the sampled data directly to the low latency RAM 730 without interruption from the memory bus 762 and elements coupled thereto, as will be appreciated in light of the present disclosure.

In an embodiment, the embedded processor 720 also includes a FPU unit 741 which is a specialized co-processor that may process numbers more rapidly than a conventional CPU, which also performs all other functions and routines for a device. Processing is further improved with the combined CPU 740 and FPU 741, in which the FPU processes sampled data in memory, and the CPU 740 performs other functions and routines of the flicker measuring device, such as sending data to the serial communication interface.

Figure 8:
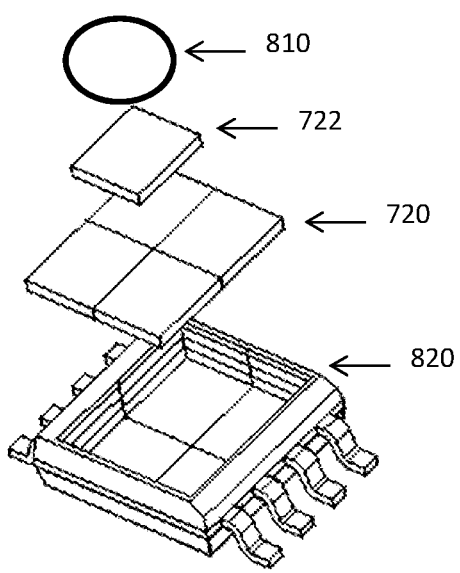
FIGS. 8 and 9 illustrate an exploded view and assembled view, respectively of an example implementation including the device shown in FIG. 7, in accordance with the example embodiment of FIG. 7.

FIG. 8 illustrates an exploded view of an example implementation including the device shown in FIG. 7, configured in accordance with the example embodiment of FIG. 7. The device includes a sensor lens 810, a photo sensor 722, the embedded processor 720, and an external packaging 820. As shown, the USB driver is not an external component, but rather disposed within the packaging 820, in accordance with an embodiment.

Figure 9:
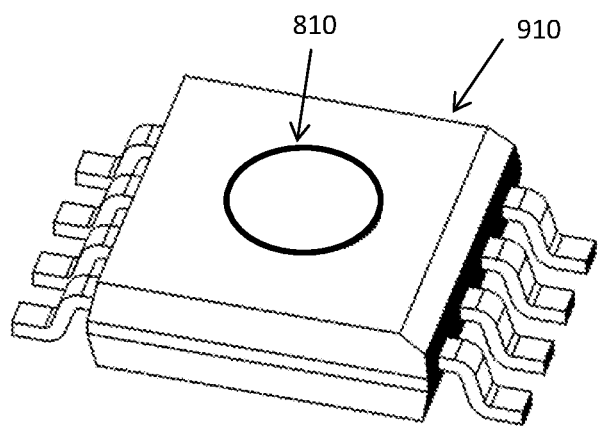

FIG. 9 illustrates an assembled view of an example implementation including the device shown in FIG. 7, configured in accordance with the example embodiment of FIG. 7. As shown, the sensor lens 810 is on an external surface of the assembled device 910. The fully assembled device 910 includes the sensor lens 810, the photo sensor 722 (not shown in FIG. 9) and the embedded processor 720 (not shown in FIG. 9), within the packaging of the overall device, in accordance with an embodiment.

Methodology—Flicker Measuring Device

Figure 10:
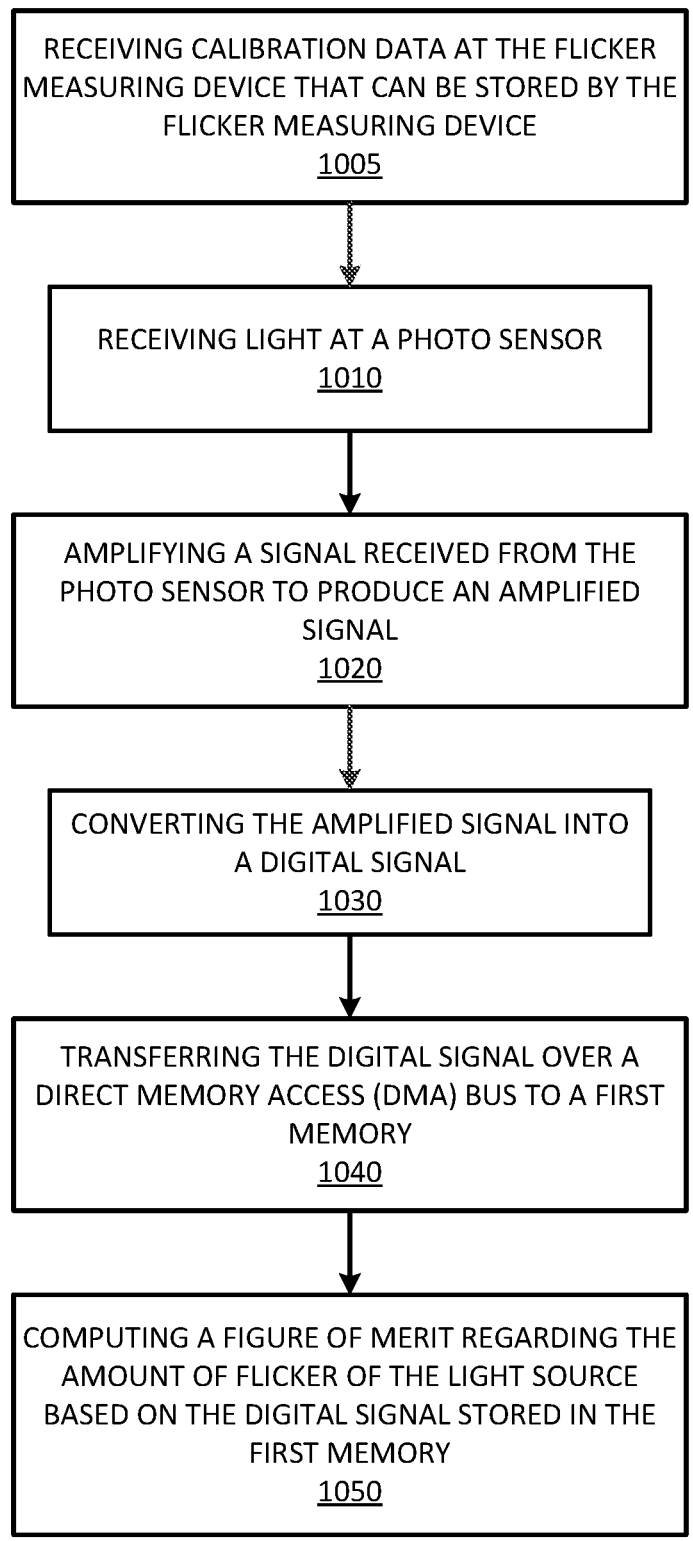
FIG. 10 illustrates a methodology for measuring an amount of flicker produced by a light source, in accordance with an example embodiment of the present disclosure.

FIG. 10 illustrates a methodology for measuring an amount of flicker produced by a light source, in accordance with an example embodiment of the present disclosure. The method may be carried out, for example, by any of the embodiments shown in FIGS. 1-9, although any number of other configurations will be apparent in light of this disclosure. The method allows a flicker measuring device to provide a relatively accurate figure of merit regarding an amount of flicker of a light source using a dedicated processor and dedicated photo sensor.

In some cases, at the end of production, a fully packaged and ready-to-be-shipped flicker measuring device may be calibrated in accordance with the teachings of the present disclosure. The calibration ensures that color information, brightness information of the light, and dynamic light properties are reported correctly. The "color information" is considered to be the spectral makeup of the light, and thus the ratio of the amplitudes of the different color channels. The "brightness" information is considered to be the absolute amplitude of the different color channels. The "dynamic light properties" are considered to be the flicker values. The calibration of dynamic properties may include adjustment of programmable delay times inside the flicker measuring device to compensate for process tolerances in chip manufacturing and their implications on, e.g., clock speeds, analog-to-digital converter precision, etc.

In an embodiment, the method of calibration includes radiating a flicker measuring device with a light signal having known characteristics and a known spatial configuration. The known light characteristics of the light signal may include color, intensity, waveform/change in time, sinusoidally modulated light, etc. The calibration data is then derived from the radiated light signal having known characteristics and spatial configuration. The calibration data is then received at block 1005 at the flicker measuring device, and the flicker measuring device may store the calibration data. The calibration data may then be used for future validation of device operation when the data is stored in the flicker measuring device. Optionally, prior to being shipped, the flicker measuring device may be validated to ensure that the flicker measuring device provides the correct results by exposing the flicker measuring device to known light conditions and sequences.

The calibration may be accomplished in several ways. One example calibration technique is that the calibration data may be stored in EEPROM or flash memory (i.e. 232, 332, 732 in FIGS. 2, 3 and 7, respectively). Another example calibration technique is to use a laser to manipulate the active area of the sensor elements and/or burn fuses on the ASIC. In a laser embodiment, the laser light is able to penetrate to the ASIC, as the construction of the lens above the sensor elements are designed accordingly, so that the relevant area of the ASIC may also be accessible, or otherwise seen, from the outside of the package. Another option is that the laser trimming is done at the end of the front-end production, before the chip(s) are package in the backend of the production process.

In an embodiment, the method of measuring flicker, after receiving optional calibration data, commences at block 1010 by receiving a signal from a light source at a photo sensor. For example, at the photo sensor 124, 222, 422, or 722 shown and described herein. The amplifier (for example, amplifier 126, 226, 426, or 726 shown and described herein) next amplifies the light source signal at block 1020 to produce an amplified signal. At block 1030, the method includes converting the amplified signal into a digital signal, which for example may be performed by the analog-to-digital converter 242, 442, or 742 shown and described herein. The method also includes, at block 1040, transferring the digital signal over a DMA bus to a first memory, which may be performed, for example, by a processor (240, 440, or 740) transferring the digital signal over a DMA bus (264, 464, or 764) to a first memory (230, 430, or 730). The method includes computing, at block 1050, a figure of merit regarding the amount of flicker of the light source, based on the digital signal stored in the first memory. The computing may be performed, for example, by FPU 241, 441, or 741, in accordance with an example embodiment.

As will be appreciated in light of the present disclosure, at block 1040, the digital signal from the ADC is transferred to a first memory (e.g., a first memory bank of the 0-wait RAM) and, at the same time, the data stored in the second memory (e.g., a second memory bank of the 0-wait RAM) may be accessed by the CPU to process the data. Once the first memory is full, and the second memory is fully processed, the memory is swapped so that the second memory bank is filled by the ADC and the first memory bank is accessed by the CPU. This swap continues as long as desired, or until all of the data has been gathered and processed, as will be appreciated in light of the present disclosure.

Advantages of systems according to some embodiments of the present disclosure should be apparent in light of this disclosure. For instance, possible advantages of some embodiments include providing a low-cost light quality measurement tool that is readily usable by non-technical individuals and enabling product testing for flicker at a large scale. Note that not all embodiments of the present disclosure require any or all of these various advantages, and numerous configurations and variations will be apparent in light of this disclosure.

Numerous variations and configurations will be apparent in light of the disclosure. For example, one example embodiment of the present disclosure provides a flicker measuring device for measuring an amount of flicker produced by a light source. The device may include a photo sensor that detects a light property of the light source and generates a signal, an amplifier operatively coupled to the photo sensor and configured to amplify the signal from the photo sensor to provide an amplified signal, an analog-to-digital converter operatively coupled to the amplifier, the analog-to-digital converter configured to receive the amplified signal and convert the amplified signal into a digital signal that corresponds to the amplified signal, a memory bus coupled to the analog-to-digital converter and to a first memory, a direct memory access (DMA) bus coupled to the analog-to-digital converter and to a second memory, and a processor coupled to the memory bus and to the DMA bus, the processor configured to receive the digital signal from the analog-to-digital converter, transfer the digital signal over the memory bus to the first memory or over the DMA bus to the second memory, and compute a figure of merit regarding the amount of flicker of the light source based on the digital signal stored in the first memory or the second memory.

In some embodiments, the device further includes a co-processor configured to analyze the digital signal stored in the first memory or the second memory and calculate a flicker value corresponding to the digital signal. In some embodiments, the processor includes the analog-to-digital converter, the DMA bus, the first memory, and the second memory, and further includes a central processing unit. In some embodiments, the first memory is a first portion of a zero-wait random access memory, and the second memory is a second portion of the zero-wait random access memory. In some embodiments, the processor is further configured to transfer the digital signal from the analog-to-digital converter to the second memory over the DMA bus until the second memory is full. In some embodiments, the device further includes an accelerometer sensor configured to detect a movement of the device and provide movement data to the processor, in which the analog-to-digital converter is further configured to generate a digital movement signal based on the movement data, and apply the digital movement signal to the digital signal to account for movement of the device. In some embodiments, the device further includes a camera to provide at least one of positional data and movement data regarding the device to the processor. In some embodiments, the device further includes a serial communication port coupled to the memory bus, the serial communication port configured to provide the figure of merit to an external device. In some embodiments, the first memory is a non-volatile memory and the second memory is a volatile memory.

Another example embodiment of the present disclosure is a method for measuring an amount of flicker produced by a light source, the method including amplifying a signal received at a device from a photo sensor to produce an amplified signal, in which the photo sensor detects a light property of the light source, converting the amplified signal into a digital signal that corresponds to the amplified signal, transferring the digital signal over a direct memory access (DMA) bus to a volatile memory, and computing a figure of merit regarding the amount of flicker of the light source based on the digital signal stored in the volatile memory.

In some embodiments, the method further includes receiving an acceleration signal from an accelerometer, and applying the acceleration signal to the digital signal to account for movement of the device. In some embodiments, the method further includes transmitting the figure of merit to an external device. In some embodiments, the method further includes receiving calibration data based on a light signal radiated at the photo sensor, the light signal having known characteristics and a known spatial configuration. In some embodiments, the volatile memory is a zero-wait memory and the method further includes storing the calibration data in a second memory location of the device, different from the volatile memory. In some embodiments, the method further includes validating the calibration data by exposing the device to the light signal having known characteristics and the known spatial configuration to validate that the device provides correct figures of merit regarding the amount of flicker produced by the light signal.

Another example embodiment of the present disclosure is a device for measuring an amount of flicker produced by a light source, the device including a photo sensor that detects a light property of the light source and generates a photo sensor signal, a direct memory access (DMA) bus coupled to a memory, and a processor coupled to the DMA bus and the photo sensor, the processor configured to receive a digital signal representing the photo sensor signal, transfer the digital signal over the DMA bus to the memory, and compute a figure of merit regarding the amount of flicker of the light source based on the digital signal stored in the memory.

In some embodiments, the device further includes an amplifier operatively coupled to the photo sensor configured to amplify the photo sensor signal from the photo sensor to provide an amplified signal, and an analog-to-digital converter operatively coupled to the amplifier and to the DMA bus, the analog-to-digital converter configured to receive the amplified signal and convert the amplified signal into the digital signal. In some embodiments, the device further includes a memory bus, and a read only memory that is coupled to the memory bus, in which the read only memory is not coupled to the DMA bus.

General Overview—Flicker Measuring System Using Portable Computing Device

Implementing a system that measures an amount of flicker produced by a light source involves a number of non-trivial issues. For example, some existing systems utilize a specialized device for measuring an amount of flicker. However, a dedicated device may often be very expensive and designed only for acquiring and analyzing flicker data. It is desirable to provide a low-cost and effective flicker measuring system that uses existing devices, such as a cell phone or a smart phone, to perform flicker measurement and analysis. It is desirable to utilize a simplified light sensor and associated light sensor circuit with a portable computing device (PCD) to measure an amount of flicker without requiring an expensive specialized device. A plug-in device may be purchased (for example, that plugs into the audio port of a portable computing device) and then software may be downloaded so that nearly anyone may make accurate flicker measurements using the flicker measuring system, without requiring a specialized or expensive tool, as will be appreciated in light of the present disclosure.

Thus, and in accordance with an embodiment of the present disclosure, a flicker measuring system is provided for determining the quality of light of a light source. The flicker measuring system includes a light sensor and associated light sensor circuit that are used to collect flicker value data and provide the data to a portable computing device for further storing and/or analysis. The light sensor and associated light sensor circuit may be provided in a housing that has an audio output that may be inserted into the audio port of a portable computing device, in accordance with an embodiment. The light sensor and circuit housing may also include a Universal Serial Bus (USB) output for connecting the housing to the PCD via a USB port of the PCD. Accordingly, the housing may include an audio output that may be inserted into the audio jack only, or may include an audio output and a USB output so that the housing interfaces with both the audio jack and the USB port of the PCD. In an embodiment, the light sensor and light sensor circuit may include a light sensor that receives light and converts the light into an electrical signal, am amplifier that converts the electrical signal into a voltage signal, a low-pass filter to remove unwanted noise from the voltage signal, a signal limiter to limit an amount of voltage produced by the voltage signal, and an audio output to provide the voltage signal to an audio sub-system of the PCD. Users connect the light sensor and circuit to the portable computing device through the USB port and audio-jack, or via audio-jack only, and then point the sensor to the light they are interested in measuring for flicker value. The user may then initiate the software on the portable computing device, which analyzes the received data and reports the light quality metrics of the light source to which the light sensor is pointed, in accordance with an embodiment of the present disclosure.

It will be appreciated in light of the present disclosure that the flicker measuring system is configured to measure a light property of the light source using a light sensor. Note that this is not measuring an electrical property, such as current or voltage, of the lighting circuit itself, but rather the quality of light emitted from the light source, as measured by the light sensor and sent to the PCD for further processing. By measuring the light property, flicker measurement accuracy is improved, as will be appreciated in light of the present disclosure.

Numerous packaging and form factors will be appreciated in light of this disclosure. In accordance with an embodiment, the device may be implemented as an appropriate housing having the components stored therein and an audio output configured to engage with an audio port of the PCD, or as an application specific integrated circuit (ASIC) chip having some or all of the components of the light sensor and light sensor circuit.

System Architecture—Flicker Measuring System

Figure 11:
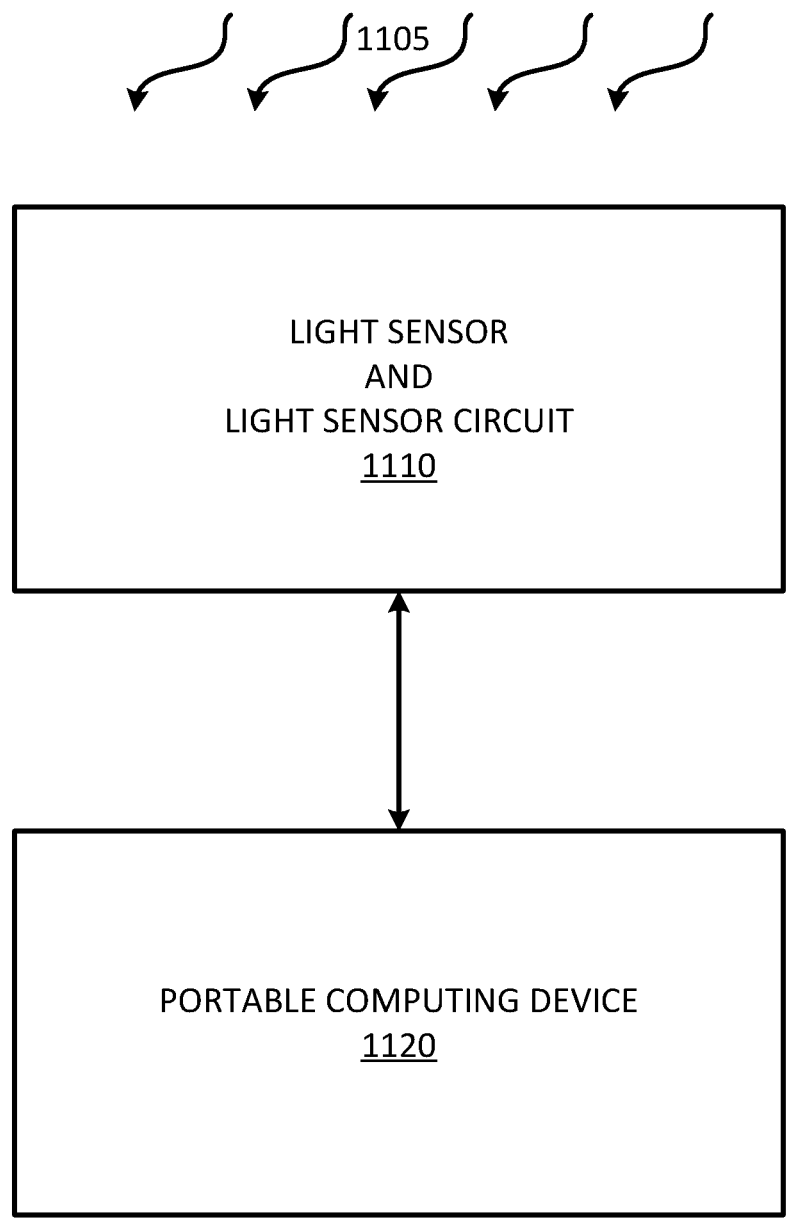
FIG. 11 illustrates a block diagram of a system for measuring an amount of flicker produced by a light source, the system including a light sensor, an associated light sensor circuit, and a portable computing device, in accordance with another example embodiment of the present disclosure.

FIG. 11 illustrates a block diagram of a system for measuring an amount of flicker produced by a light source, the system including a light sensor, an associated light sensor circuit, and a portable computing device (PCD), in accordance with another example embodiment of the present disclosure. In an embodiment, the flicker measuring system includes a light sensor and light sensor circuit 1110 and a portable computing device 1120. During operation, light waves 1105 from a light source (not shown) are received at a light sensor and light sensor circuit 1110, in accordance with an example embodiment of the present disclosure. The light sensor and associated light sensor circuit 1110 are configured to generate an electrical current signal indicative of the light 1105 received, and to provide the signal to the portable computing device 1120, as will be appreciated in light of the present disclosure. The PCD 1120 is then configured to analyze the data using various applications stored and/or downloaded onto the PCD 1120.

Figure 12:
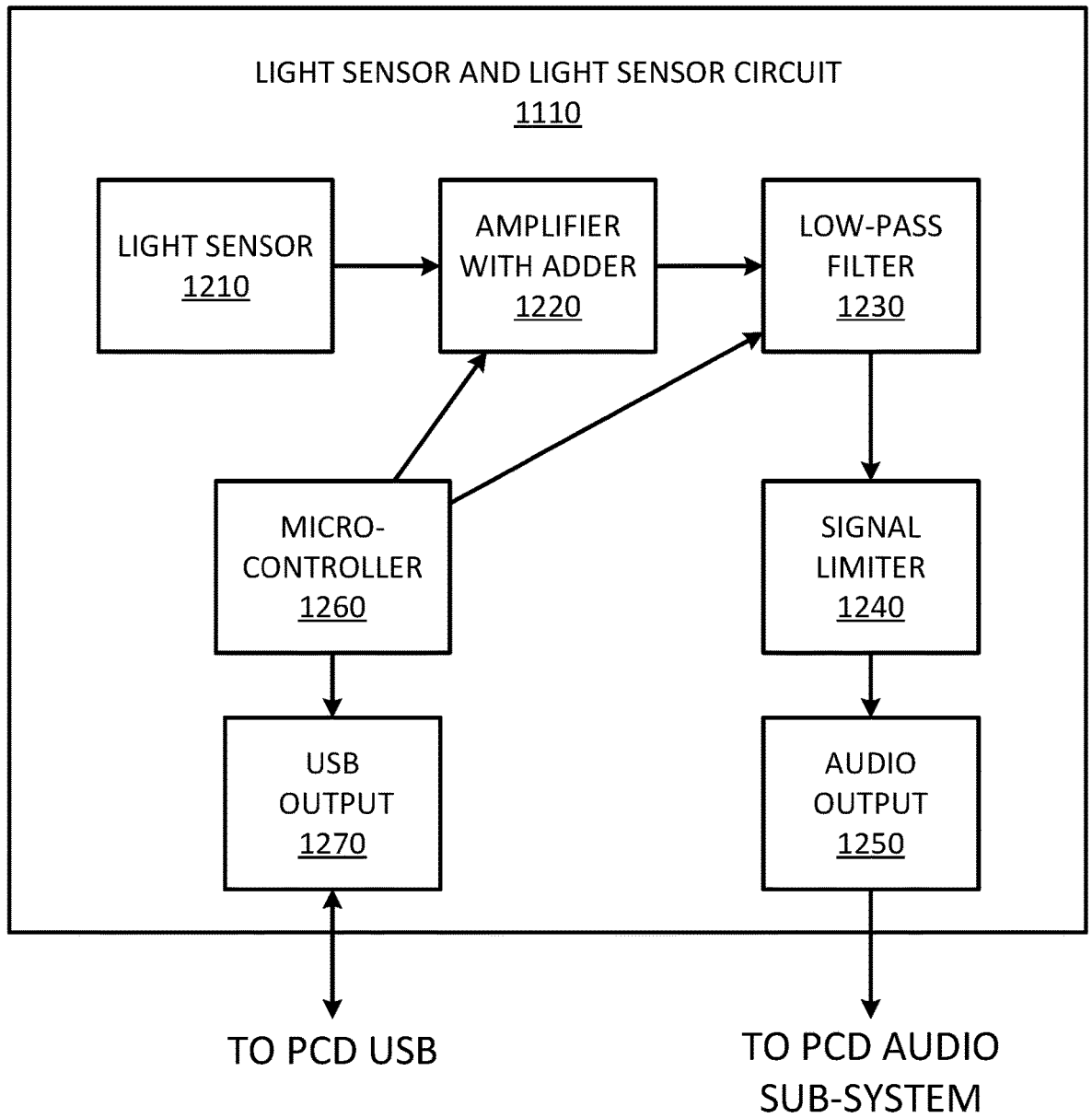
FIG. 12 illustrates a block diagram of the components of the light sensor and associated light sensor circuit, in accordance with an example embodiment of the present disclosure.
Figure 14:
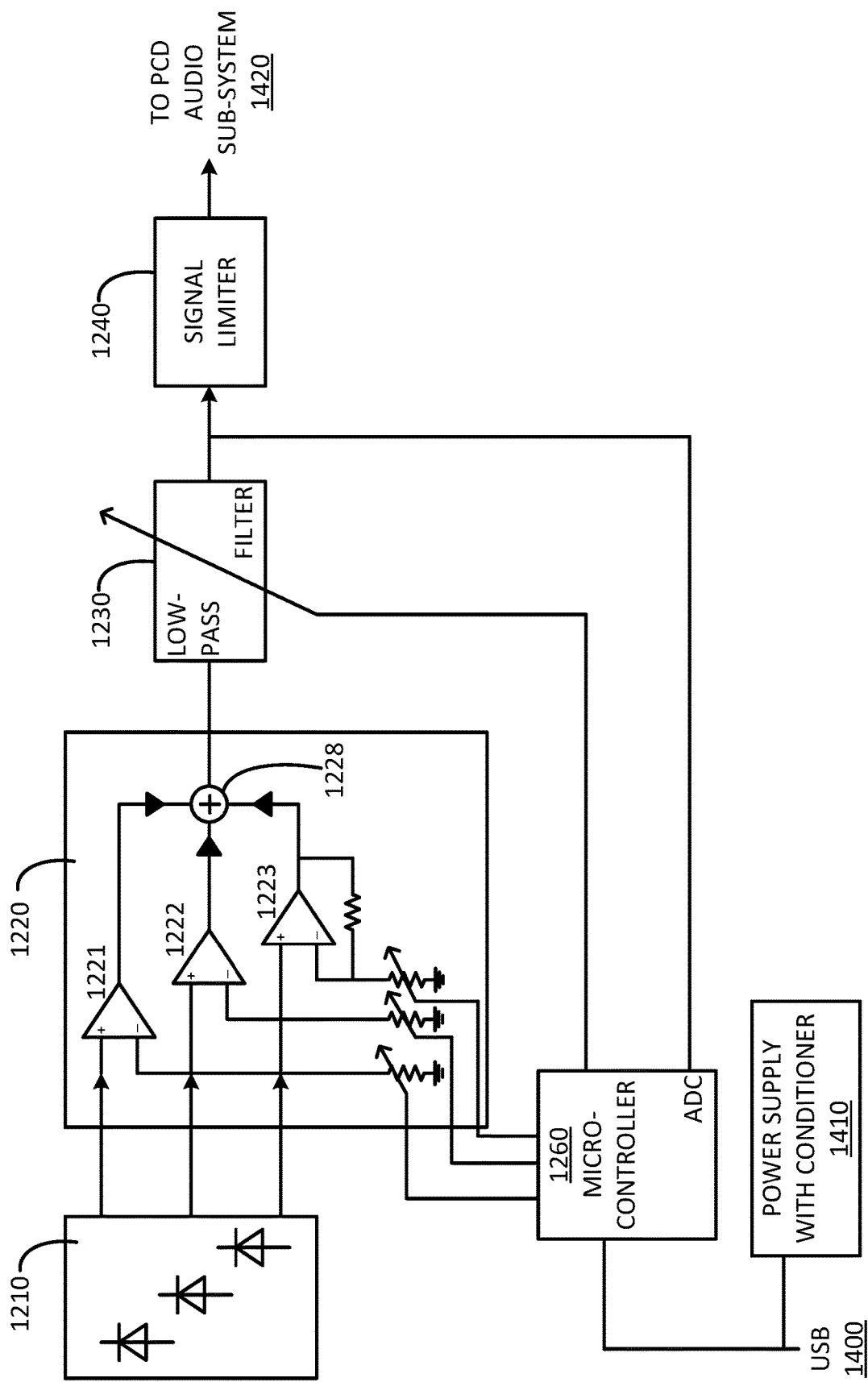
FIG. 14 illustrates a schematic diagram of the light sensor and associated light sensor circuit in an audio and Universal Serial Bus (USB) configuration, in accordance with an example embodiment of the present disclosure.
Figure 15:
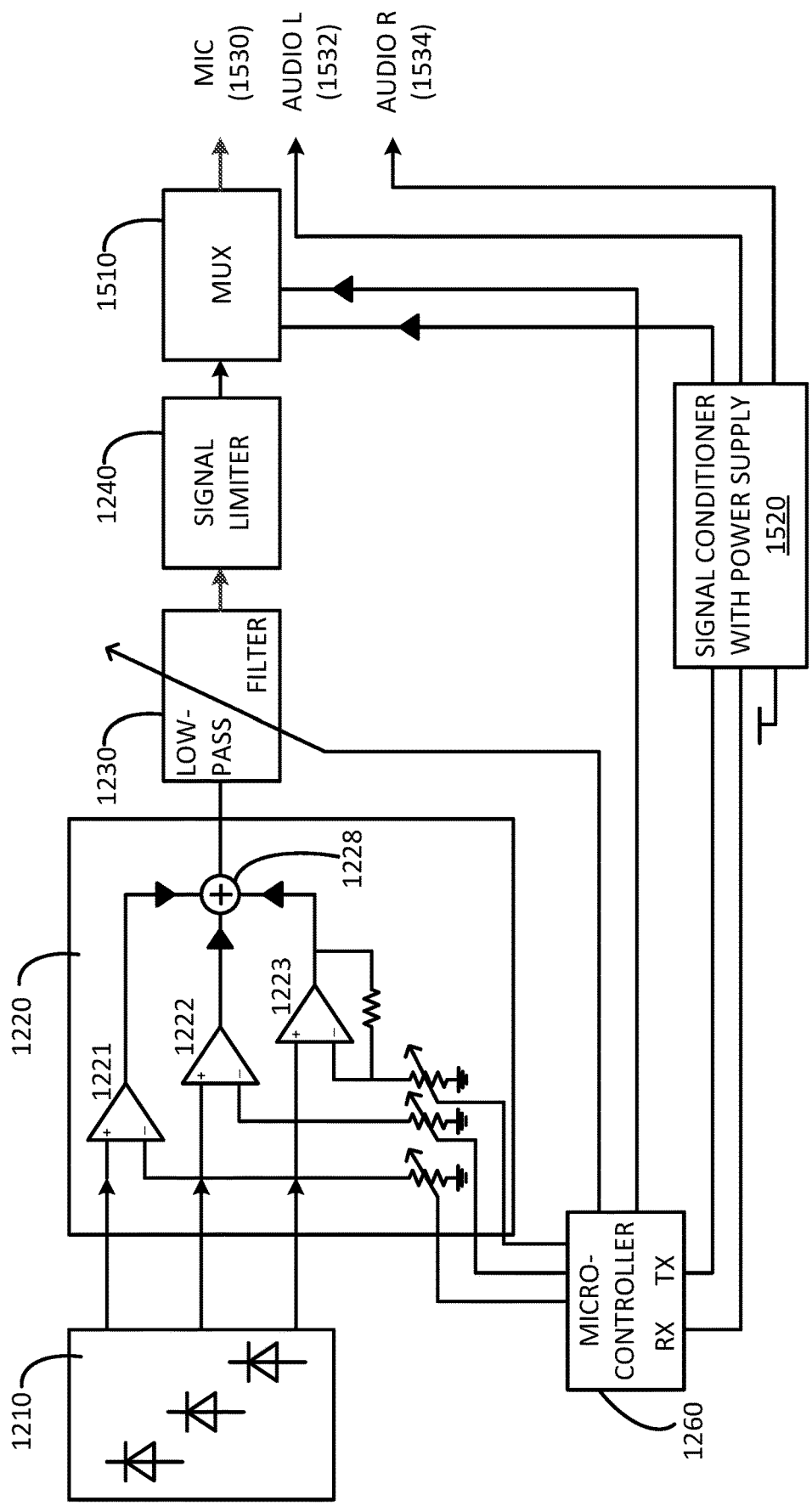
FIG. 15 illustrates a schematic diagram of the light sensor and the light sensor circuit in an audio-only configuration, in accordance with an example embodiment of the present disclosure.

FIG. 12 illustrates a block diagram of the components of the light sensor and associated light sensor circuit, in accordance with an example embodiment of the present disclosure. Refer to FIGS. 14 and 15 for example schematic diagrams of the light sensor and associated light sensor circuit. The light sensor and associated light sensor circuit 1110 includes a light sensor 1210, an amplifier with adder 1220, a low-pass filter 1230, a signal limiter 1240, an audio output 1250, and a micro-controller 1260. In some embodiments, the light sensor and light sensor circuit 1110 may also include a USB output 1270 for interfacing with a USB port of the PCD. The light received at the light sensor 1210 is collected and transformed into an electrical current signal. The amplifier with adder 1220 converts the electric current signals to a voltage and the low-pass filter 1230 is used to remove undesirable higher frequencies out of the voltage signal. The parameters of the low-pass filter 1230 may be set and controlled by the microcontroller 1260, as will be appreciated in light of the present disclosure. For example, if the audio subsystem has a certain sampling frequency, then the microcontroller 1260 may change a corner frequency of the low-pass filter, or another parameter of the light sensor circuit. A signal limiter 1240 then prevents the voltage on the output of the light sensor and light sensor circuit 1110 from exceeding the ratings of the portable computing device. The output of the signal limiter 1240 is then fed via an audio output 1250 of the light sensor and circuit 1110 to the audio sub-system of the portable computing device (PCD).

It will be appreciated in light of the present disclosure that the power for the light sensor and circuit 1110 may come from an audio port or jack (via left audio or right audio output), or via the USB. In an audio-only embodiment, the power and communication both are sent and received via the audio port/jack, for both digital and analog communications with the PCD. In USB and audio embodiments, the power and commands are received from the USB port, and the audio port/jack is used for data to be sent to the PCD for sampling, processing and analysis by the PCD.

As will be appreciated in light of the present disclosure, there is software running in the microcontroller 1260 that interfaces with software on the PCD (e.g., the software engine 1320 and the GUI 1330 shown in FIG. 13) to obtain, collect, analyze, and further process the data. For example, changes in the PCD may be communicated to the microcontroller 1260 so that the microcontroller 1260 may adjust the values or parameters of the light sensor circuit to account for changes in the PCD.

Figure 13:
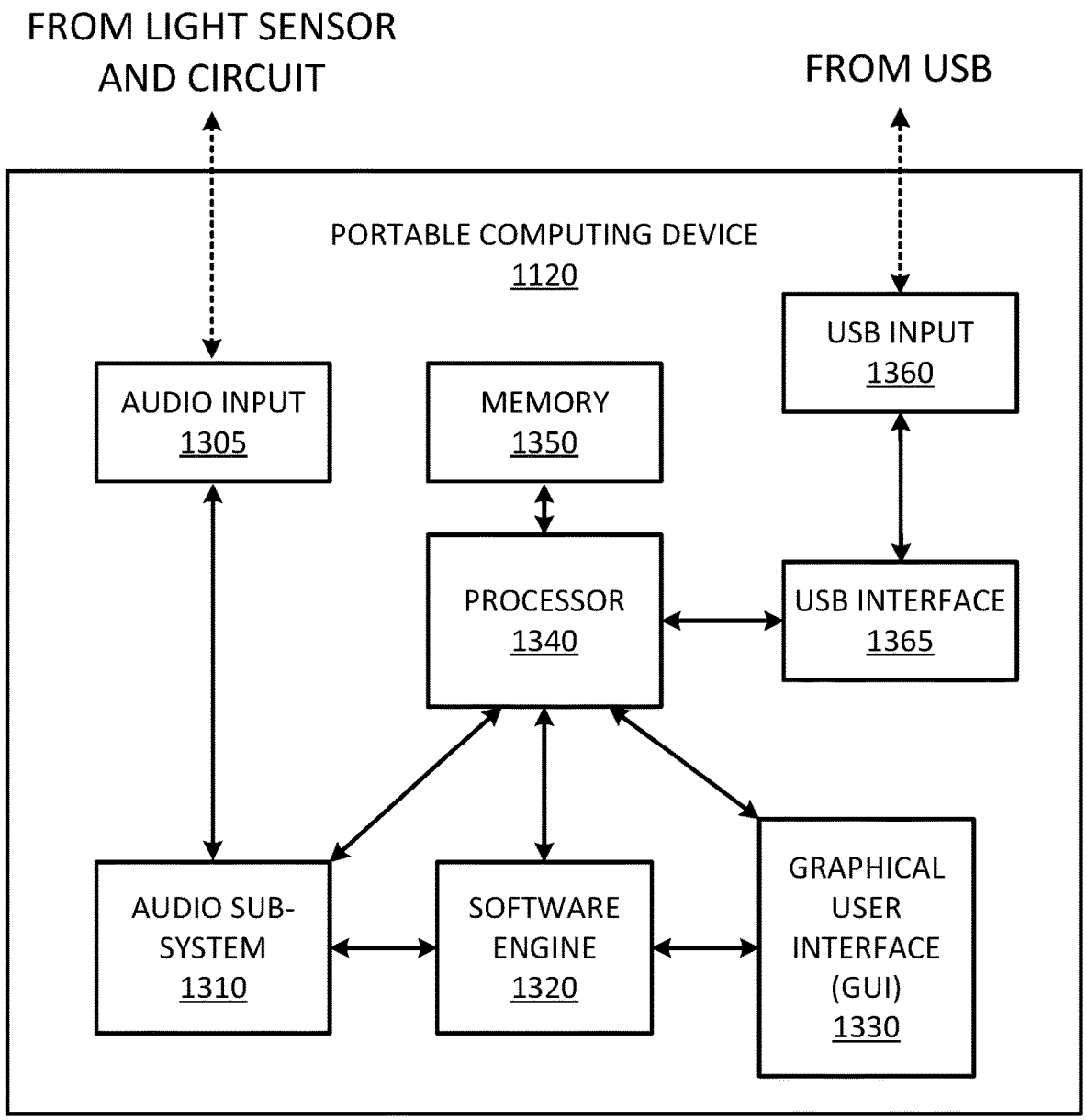
FIG. 13 illustrates a block diagram of the components of the portable computing device, in accordance with an example embodiment of the present disclosure.

FIG. 13 illustrates a block diagram of the components of the portable computing device, in accordance with an example embodiment of the present disclosure. The portable computing device 1120 receives a voltage signal from the light sensor and associated circuit (1110) which is received at the audio sub-system 1310 via an audio input of the PCD 1120. The portable computing device 1120 includes a software engine 1320 and a graphical user interface (GUI) 1330 under control of, and executable by, a processor 1340 coupled to a memory 1350. The software engine 1320 and the GUI 1330 are software applications that may be simultaneously executed by the processor 1340 of the PCD, in accordance with an embodiment of the present disclosure. The GUI refers to a software component, rather than a hardware component such as a physical display, as will be appreciated in light of the present disclosure. The GUI 1330 communicates with the software engine 1320, sets parameters for operation (for example, during the configuration phase), and visualizes collected data on a display of the PCD, in accordance with an embodiment of the present disclosure.

Note that although the software engine 1320 and the GUI 1330 are shown separated from memory 1350; in some embodiments the software engine 1320 and the GUI 1330 may be stored in memory 1350. It will be appreciated that the memory 1350 may be RAM, ROM, FLASH, or a combination thereof, as well as other types of transitory and non-transitory computer-readable memory.

The software engine 1320 may run on the portable computing device 1120 by being started directly by a user of the PCD or by the GUI being started and then automatically starting the software engine 1320. The software engine 1320 manipulates the audio sub-system 1310 into sampling and buffering the voltage signal received from the light source and associated circuit (1110). The software engine 1320 interacts with the audio drivers of the audio sub-system 1310 of the PCD 1120 to initiate continuous sampling and buffering of the audio signal on the microphone input. The sampling frequency and the buffer length may be controlled by the user interacting with the GUI 1330, in accordance with an example embodiment. The user may also choose to record the session to local storage (e.g., memory 1350) for later analysis. During the sampling, certain time-domain light metrics may be directly calculated (e.g., mean light, minimum or maximum values, flicker index, flicker percentage, or lux value, or the correlated light temperature). All the data may be made available to the GUI for display on a display of the PCD, or as a data point over a command-line-interface or may be stored directly in memory 1350. The audio sub-system may also be controlled by the software engine 1320 by blocking access to the audio from other applications and services, for example to prevent the user from talking on the phone while also performing the flicker measurement through the microphone input of the phone.

The software engine 1320 is also responsible for processing of the buffered signal, in accordance with an example embodiment of the present disclosure. Once the buffer has been filled to a certain length, its content is transferred to a standard memory, and from there different metrics of light in time-domain or in frequency-domain may be calculated (e.g., computation of modulation ratios of different frequencies using FFT, evaluation of different weighted sums of modulation ratios, flicker index or percentage, etc.). The buffer and the standard memory are both represented by "memory 1350" and it will be appreciated that various configurations of memory may be implemented. This data is locally stored and buffered, so that it is available either to the GUI 1330, or to other processes running on the portable computing device 1120 that have established a connection with the software engine 1320.

The software engine 1320 communicates with the light sensor and associated circuit (1110) so that the entire flicker measuring system performs optimally. For example, when a change in the sampling frequency of the audio sub-system occurs, the software engine 1320 may instruct the light sensor circuit, and more specifically the microcontroller, to change the corner frequency of the low pass-filter. Alternatively, the software engine may change the channel amplifications so as to adjust the mixing of the channels to the type of light being monitored.

In an embodiment, the light sensor and associated circuit may have at least two modes of operation, including an "acquisition" mode for acquiring flicker data, and a "configuration" mode for configuring the light source and associated light source circuit. On devices that utilize only an audio-jack (for example, as shown in FIG. 15), this requires a change of internal state of the light sensor and associated circuit from "acquisition" to "configuration" mode. In the configuration mode, the microphone line is connected through the multiplexer to the micro-controller for two-way communication with the portable computing device. During configuration, parameters for the light sensor circuit are received from the PCD and are set for the light sensor circuit by the microcontroller. Then the configuration mode ends and during the acquisition mode the light sensor, under control of the microcontroller, collects data and reports values to the PCD.

The graphical user interface (GUI) 1330 runs on the portable computing device after it has been started by the user. Upon exit, the user may choose to stop the software engine, and so release the audio resources to other applications and services, or to continue data collection. The software engine may also continue to run while the GUI is exited. The GUI is responsible for initiating the software engine, if it has not yet already been initialized. The GUI runs on top of the software engine. Thus, it has to verify that the software engine is running before it may start executing tasks. The GUI has the ability to start and/or stop the software engine. The GUI allows for easy access to the light sensor and associated circuit, and also to the software engine control parameters and the modification thereof. In an embodiment, a user may change the parameters on their own, or allow the GUI to optimize the parameters with respect to the light being monitored (e.g., sampling frequency, magnification). The GUI collects data from the software engine and then may plot the data on a screen of the PCD in time- and frequency-domain. The GUI also offers the possibility of saving the recording session in a lossless audio format.

It will be appreciated in light of the present disclosure that the GUI is a software application that is executable by the processor of the PCD, and may be running on the PCD simultaneously with the software engine. Thus, the GUI communicates with the software engine, however the GUI does not need to be running or otherwise "on" (i.e. executed by the processor) for the software engine to be able to perform analysis. Accordingly, the physical display of the PCD may be accessible by other applications and programs on the PCD while the software engine performs flicker analysis in the background. For example, during a lengthy period of analysis the display may be available for sending a text message or accessing a web browser or other application, with the only drawback being that the audio is not available during the data collection and analysis. However, the software engine is able to perform analysis without requiring the GUI to be running so that the display may be available for other PCD resources.

The GUI also includes a "record-on-trigger" feature, which allows a user to preselect one or more light patterns (or their combinations) that will trigger the recording of light waveform for a predefined certain duration of time. Combinations may be selected using logic operators (such as 'or' or 'and', or constructs, such as 'after'). An example of such a preselected pattern or transient is flashing (transient characterized by max-min light over certain time interval greater than threshold). The GUI also includes a "compare" feature. In some instances, a user may have recorded an earlier analysis of the same light source. Through the GUI, the user may compare the light between selected sessions and, for example, plot one over the other, compare and plot the light metric, and so forth.

FIG. 14 illustrates a schematic diagram of the light sensor and associated light sensor circuit in an audio and USB configuration, in accordance with an example embodiment of the present disclosure. The components of the light sensor and associated light sensor circuit 1110 are shown in a detailed schematic diagram, according to an example embodiment of the present disclosure, in which the light sensor and associated circuit are plugged into both the audio jack and the USB port of the portable computing device. In this example embodiment, the light source and associated circuit receive power, via a power supply with conditioner 1410, and commands from the USB port 1400 (e.g., 1350 in FIG. 12), and the sampling, processing and analysis is performed using the audio sub-system via output 1420 (e.g., 1310 of FIG. 13) of the portable computing device.

The light sensor 1210 may be a three-color light sensor that collects light and transforms it into an electric current signal, in which each of the color channels has a responsivity that is different from the other two channels. Thus, the three-color light sensor produces three electric current signals in an embodiment. The three electric current signals are received at a three channel configurable transimpedance amplifier with adder 1220. The amplifier with adder 1220 includes three separate amplifiers 1221, 1222, 1223, with each channel utilizing a controlled variable resistor coupled between the amplifiers 1221, 1222, 1223, and the microcontroller 1260. The amplifier with adder 1220 converts each of the three electric current signals to a voltage. The voltages from each channel are then added together in a single voltage signal by the adder 1228. As will be appreciated, the transimpedance amplifier has a bandwidth that matches the bandwidth of the portable computing device audio sub-system, which is a standard bandwidth matched to the human hearing, and is approximately 48,000 Hz in an embodiment. In some cases, more than one channel may be provided on the light sensor and likewise more than one channel on the associated amplifier. In such cases, the adder is accordingly configured to add the voltages together to provide a single output voltage. Note that although a three-color light sensor and three-channel amplifier are shown, any number of channels may be used on the light sensor and the amplifier, so long as the number of channels on the sensor and on the amplifier are the same.

The voltage signal is then sent through a low-pass filter 1230, which may be a controlled variable frequency low-pass filter 1230, in accordance with an example embodiment of the present disclosure. The low-pass filter 1230 operates to remove undesirable higher frequencies out of the voltage signal, and the frequency of the low-pass filter 1230 may be controlled by the microcontroller 1260.

A signal limiter 1240 prevents the voltage on the output of the light sensor circuit from exceeding the safe ratings of the audio sub-system input of the PCD. In some cases, the signal limiter may be a hard-wired voltage limiter that is hard-wired into the circuit.

FIG. 15 illustrates a schematic diagram of the light sensor and the light sensor circuit in an audio-only configuration, in accordance with an example embodiment of the present disclosure. The components of the light sensor and associated light sensor circuit 1110 are shown in a detailed schematic diagram, according to another example embodiment of the present disclosure in which the light sensor and associated circuit are plugged into the audio jack only of the portable computing device. In this example embodiment, the light source and associated circuit utilize the audio-jack interface for all digital and analog communication with the portable computing device, as well as for powering the light source and associated light source circuit.

The light sensor 1210 may be a three-color light sensor that collects light and transforms it into an electric current signal. The three electric current signals are received at a three channel configurable transimpedance amplifier with adder 1220. The amplifier with adder 1220 converts each of the three electric current signals to voltage. The voltages from each channel are then added together in a single voltage signal by the adder 1228. The transimpedance amplifier has a bandwidth that matches the bandwidth of the portable computing device audio sub-system, as will be appreciated in light of the present disclosure.

The voltage signal is then sent through a low-pass filter 1230, which may be a controlled variable frequency low-pass filter, in accordance with an example embodiment of the present disclosure. The low-pass filter operates to remove undesirable higher frequencies out of the voltage signal and may be controlled by the microcontroller 1260.

A signal limiter 1240 prevents the voltage on the output of the light sensor circuit from exceeding the safe ratings of the audio sub-system input. In some cases, the signal limiter may be a hard-wired voltage limiter that is hard-wired into the circuit.

For devices that use only an audio-jack, following the signal limiter 1240 is a multiplexer 1510 controlled by the microcontroller 1260 coupled to the multiplexer 1510. It will be appreciated that the microphone line 1530 is the input to the PCD, and that the audio L (1532) and audio R (1534) are the left and right audio channels of the PCD, respectively. The multiplexer 1510 determines whether the microphone line 1530 will receive digital data, or the analog light data. In other words, the multiplexer 1510 determines whether the light source circuit will output digital data or analog data via the audio output to the microphone line 1530 of the PCD. The signal conditioner 1520 interfaces with the left and right audio channels 1532, 1534 and the microcontroller 1260 to receive data from the PCD via the left and right audio channels 1532, 1534. The microcontroller 1260 and the multiplexer 1510 determine the appropriate (analog or digital) output for the microphone line 1530 based on the values received from the left audio channel 1532 and right audio channel 1534, as will be appreciated in light of the present disclosure. Accordingly, if digital data is received from the left and right audio channels 1532, 1534, then the multiplexer 1510 outputs a digital signal, whereas if analog data is received from the left and right audio channels 1532, 1534, then the multiplexer 1510 outputs an analog signal.

Methodology—Flicker Measuring System

Figure 16:
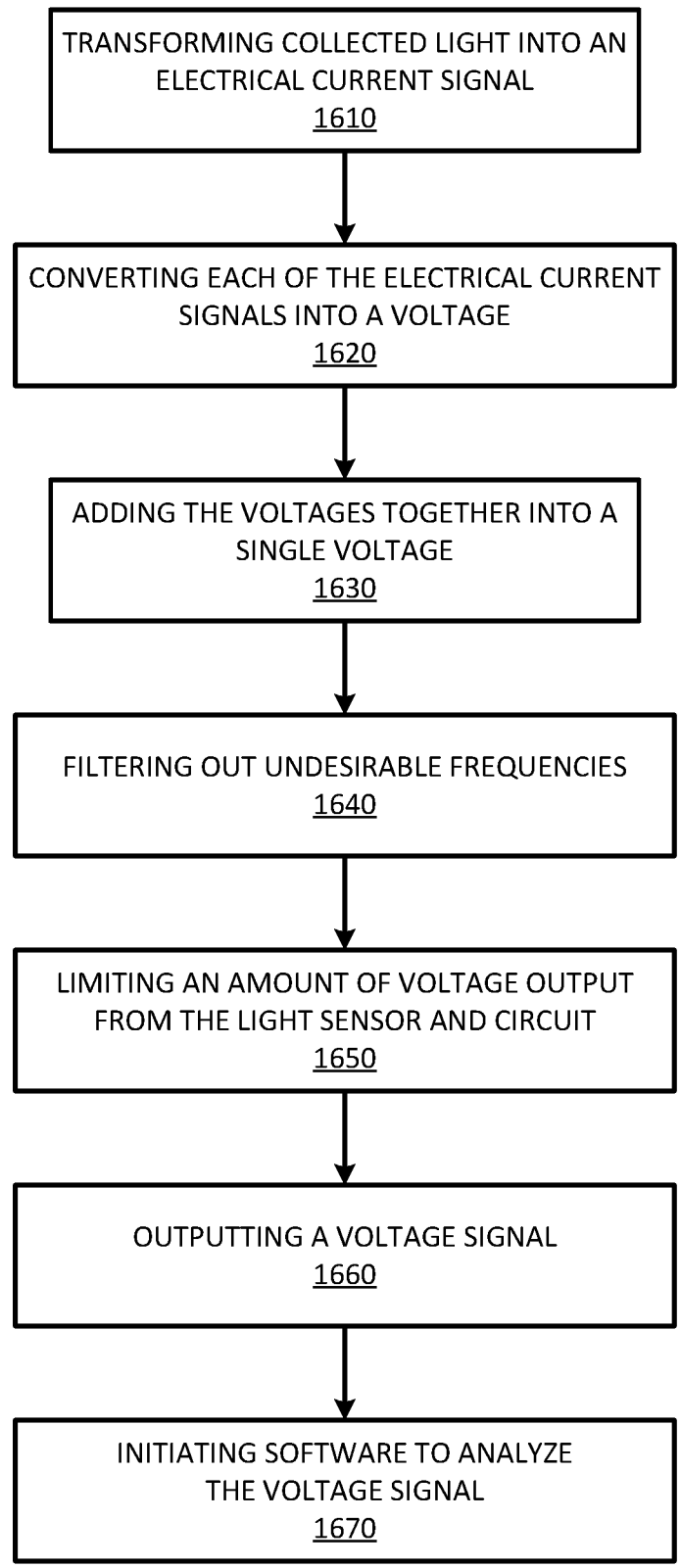
FIG. 16 illustrates a methodology for measuring an amount of flicker produced by a light source using the light sensor, associated light sensor circuit and the portable computing device, in accordance with an example embodiment of the present disclosure.

FIG. 16 illustrates a methodology for measuring an amount of flicker produced by a light source using the light sensor, associated light sensor circuit and the portable computing device, in accordance with an example embodiment of the present disclosure. The method may be carried out, for example, by any of the embodiments shown in FIGS. 11-15, although any number of other configurations will be apparent in light of this disclosure. The method allows a flicker measuring system to provide a relatively accurate figure of merit regarding an amount of flicker of a light source using a dedicated light sensor and associated circuit coupled to a USB and audio jack (or audio jack only) of a portable computing device, in accordance with an embodiment of the present disclosure.

In an embodiment, the method of measuring flicker includes transforming, at block 1610, collected light into an electrical current signal. This may, for example, include transforming light into three separate electrical current signals. For example, the light sensor 1110 may perform the collecting and transforming of light into an electrical current signal.

The method includes converting, at block 1620, each of the electrical current signals into a voltage. The converting may be performed, for example, by an amplifier, which may convert each of the three electrical current signals into three separate voltage signals. If there is more than one current signal, each will be converted into a separate voltage signal, for example by amplifiers 1221, 1222, 1223 of FIGS. 14 and 15.

The voltage signals may then be added together at block 1630 into a single voltage signal. This may, for example, be performed by the adder 1228 of FIGS. 14 and 15, which combines the voltage signals together into a single voltage signal.

The method includes filtering out, at block 1640, any undesirable frequencies from the voltage signal. This may be performed, for example, by the low-pass filter 1230 shown and described herein. The filter may be a variable frequency low-pass filter in which the microcontroller controls the frequency of the low-pass filter, according to an embodiment of the present disclosure.

The method includes limiting, at block 1650, an amount of voltage output by the light sensor and associated circuit using a voltage limiter. The signal limiter may, for example, be the signal limiter 1240 shown and described herein.

The method includes outputting at block 1660 a voltage signal via an audio output of the light sensor and associated circuit. The voltage signal may be output to the PCD via the audio output (for example 1270 of FIG. 12). The method further includes initiating, at block 1670, software to analyze the voltage signal, which may be performed by a user on the PCD initiating the software via the GUI, in accordance with an embodiment. The software engine may be initiated manually by the user or automatically, for example in response to the light source and associated circuit being plugged into the audio port of the PCD.

Advantages of systems according to some embodiments of the present disclosure should be apparent in light of this disclosure. For instance, possible advantages of some embodiments include providing a low-cost light quality measurement tool that is readily usable by non-technical individuals and enabling product testing for flicker at a large scale. Note that not all embodiments of the present disclosure require any or all of these various advantages, and numerous configurations and variations will be apparent in light of this disclosure.

Numerous variations and configurations will be apparent in light of the disclosure. For example, one example embodiment of the present disclosure provides a device for measuring flicker produced by a light source, the device including a light sensor configured to transform collected light into an electrical current signal, a circuit coupled to the light sensor, the circuit configured to convert the electrical current signal into a voltage signal, and an audio output coupled to the circuit, the audio output configured to interface with an audio input of a portable computing device and to transmit the voltage signal via the audio output to an audio sub-system of the portable computing device coupled to the audio input. In some embodiments, the light sensor and the circuit are disposed on a same printed circuit board. In some embodiments, the light sensor is a three-color light sensor having three channels that each have a responsivity different from the other two channels, and the three-color light sensor is configured to generate three electric current signals. In some embodiments, the circuit includes a three-channel amplifier configured to convert each of the three electric current signals into three voltage signals, and in which each channel of the three-channel amplifier utilizes a controller variable resistor. In some embodiments, the circuit includes an amplifier configured to convert the electrical current signal into the voltage signal, a low-pass filter configured to filter out undesirable higher frequencies from the voltage signal, and a voltage limiter configured to limit an amount of voltage output to the audio subsystem from the voltage signal by the audio output of the device. In some embodiments, the amplifier has a bandwidth that matches a bandwidth of the audio sub-system of the portable computing device. In some embodiments, the circuit further includes a microcontroller coupled to the low-pass filter, and in which the low-pass filter has a variable frequency that is controlled by the microcontroller. In some embodiments, the circuit further includes a multiplexer that determines whether the voltage signal is transmitted from the circuit as digital data or as analog data. In some embodiments, the device is configured to draw power from a universal serial bus (USB) port of the portable computing device and transmit the voltage signal via the audio output. In some embodiments, the device is configured to draw power via the audio output from the audio sub-system of the portable computing device.

Another example embodiment of the present disclosure provides a method for measuring flicker produced by a light source, the method including transforming, by a light sensor, light collected from the light source into an electrical current signal, converting, by a circuit coupled to the light sensor, the electrical current signal into a voltage signal, and transmitting, via an audio output jack coupled to the circuit, the voltage signal to an audio input of a portable computing device to measure the flicker of the light source.

In some embodiments, transforming the light and converting the electrical current signal includes transforming, by the light sensor, the light collected from the light source into a first electrical current signal corresponding to a first color channel, transforming, by the light sensor, the light collected from a light source into a second electrical current signal corresponding to a second color channel, transforming, by the light sensor, the light collected from the light source into a third electrical current signal corresponding to a third color channel, converting, by an amplifier of the circuit, the first electrical current signal into a first voltage signal, converting, by an amplifier of the circuit, the second electrical current signal into a second voltage signal, and converting, by the amplifier of the circuit, the third electrical current signal into a third voltage signal. In some embodiments, the method further includes adding, by an adder coupled to the amplifier, the first voltage signal, the second voltage signal and the third voltage signal into a single voltage signal that is the voltage signal transmitted to the portable computing device via the audio output.

Another example embodiment of the present disclosure provides a system including a device having a light sensor, a circuit, and an audio output, the device configured to generate a voltage signal representative of light collected by the light sensor and emitted by a light source, and to transmit the voltage signal via the audio output to an audio input coupled to an audio sub-system of a portable computing device, and a software engine executable by a processor of the portable computing device, the software engine configured to cause the audio sub-system of the portable computing device to sample and buffer the voltage signal received at the audio input and measure a flicker of the light source based on the sampled voltage signal.

In some embodiments, the circuit includes an amplifier configured to convert an electrical current signal collected by the light sensor into the voltage signal, a low-pass filter configured to filter out undesirable higher frequencies from the voltage signal, and a voltage limiter configured to limit an amount of voltage output to the audio subsystem from the voltage signal by the audio output of the device. In some embodiments, the circuit further includes a multiplexer that determines whether the voltage signal is transmitted from the device as digital data or as analog data. In some embodiments, the device is configured to draw power from a universal serial bus (USB) port of the portable computing device. In some embodiments, in which the device is configured to draw power via the audio output from the audio sub-system of the portable computing device. In some embodiments, the software engine, when executed, is configured to communicate with the light source and the device, and to modify operation of the light source and the device. In some embodiments, a user may modify operation of the light source and the device via a graphical user interface on the portable computing device.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A device for measuring an amount of flicker produced by a light source, the device comprising:
  a photo sensor that detects a light property of the light source and generates a signal;
  an amplifier operatively coupled to the photo sensor and configured to amplify the signal from the photo sensor to provide an amplified signal;
  an analog-to-digital converter operatively coupled to the amplifier, the analog-to-digital converter configured to receive the amplified signal and convert the amplified signal into a digital signal that corresponds to the amplified signal;

a memory bus coupled to the analog-to-digital converter and to a first memory;

a direct memory access (DMA) bus coupled to the analog-to-digital converter and to a second memory; and a processor coupled to the memory bus, the analog-to-digital converter, and to the DMA bus, the processor configured to:

receive the digital signal from the analog-to-digital converter;

transfer the digital signal over the memory bus to the first memory or over the DMA bus to the second memory; and compute a figure of merit regarding the amount of flicker of the light source based on the digital signal stored in the first memory or the second memory.

2. The device of claim 1, further comprising:
a co-processor configured to analyze the digital signal stored in the first memory or the second memory and calculate a flicker value corresponding to the digital signal.

3. The device of claim 1, wherein the processor includes the analog-to-digital converter, the DMA bus, the first memory, and the second memory, and further includes a central processing unit.

4. The device of claim 1, wherein the first memory is a first portion of a zero-wait random access memory, and the second memory is a second portion of the zero-wait random access memory.

5. The device of claim 4, wherein the processor is further configured to transfer the digital signal from the analog-to-digital converter to the second memory over the DMA bus until the second memory is full.

6. The device of claim 1, further comprising:
an accelerometer sensor configured to detect a movement of the device and provide movement data to the processor;

wherein the analog-to-digital converter is further configured to generate a digital movement signal based on the movement data, and apply the digital movement signal to the digital signal to account for movement of the device.

7. The device of claim 1, further comprising:
a camera to provide at least one of positional data and movement data regarding the device to the processor.

8. The device of claim 1, further comprising:
a serial communication port coupled to the memory bus, the serial communication port configured to provide the figure of merit to an external device.

9. The device of claim 1, wherein the first memory is a non-volatile memory and the second memory is a volatile memory.

10. A method for measuring an amount of flicker produced by a light source, the method comprising:
amplifying, by an amplifier, a signal received at a device from a photo sensor to produce an amplified signal, wherein the photo sensor detects a light property of the light source;

converting, by an analog-to-digital converter, the amplified signal into a digital signal that corresponds to the amplified signal;

transferring, by a processor, the digital signal over a direct memory access (DMA) bus to a volatile memory; and computing, by the processor, a figure of merit regarding the amount of flicker of the light source based on the digital signal stored in the volatile memory.

11. The method of claim 10, wherein the method further comprises:
receiving, at the analog-to-digital converter, an acceleration signal from an accelerometer; and applying, by the analog-to-digital converter, the acceleration signal to the digital signal to account for movement of the device.

12. The method of claim 10, wherein the method further comprises:
transmitting, by the processor, the figure of merit to an external device.

13. The method of claim 10, wherein the method further comprises:
receiving calibration data based on a light signal radiated at the photo sensor, the light signal having known characteristics and a known spatial configuration.

14. The method of claim 13, wherein the volatile memory is a zero-wait memory and the method further comprises:
storing, by the processor, the calibration data in a second memory location of the device, different from the volatile memory.

15. The method of claim 13, the method further comprising:
validating, by the processor, the calibration data after exposing the device to the light signal having known characteristics and the known spatial configuration to validate that the device provides correct figures of merit regarding the amount of flicker produced by the light signal.

16. A device for measuring an amount of flicker produced by a light source, the device comprising:
a photo sensor that detects a light property of the light source and generates a photo sensor signal;

an analog-to-digital converter operatively coupled to the photo sensor and to the DMA bus, the analog-to-digital converter configured to convert the photo sensor signal into a digital signal;

a direct memory access (DMA) bus coupled to a memory; and a processor coupled to the DMA bus, the analog-to-digital converter, and the photo sensor, the processor configured to:

receive the digital signal representing the photo sensor signal from the analog-to-digital converter;

transfer the digital signal over the DMA bus to the memory; and compute a figure of merit regarding the amount of flicker of the light source based on the digital signal stored in the memory.

17. The device of claim 16, further comprising:
an amplifier operatively coupled between the photo sensor and the analog-to-digital converter and configured to amplify the photo sensor signal from the photo sensor.

18. The device of claim 16, further comprising:
a memory bus; and
a read only memory that is coupled to the memory bus, wherein the read only memory is not coupled to the DMA bus.

* * * * *